United States Patent
Mickley et al.

(10) Patent No.: US 7,681,839 B2
(45) Date of Patent: Mar. 23, 2010

(54) OPTICAL TRACKING SYSTEM FOR REFUELING

(75) Inventors: Joseph G. Mickley, Kentwood, MI (US); Raymond Michael Stitt, Ada, MI (US); Frank Saggio, III, Grand Rapids, MI (US); Jane C. Pavlich, Ann Arbor, MI (US); Gregory J. Wassick, Petersburg, MI (US)

(73) Assignee: Smiths Aerospace LLC, Grand Rapids, MI (US)

( * ) Notice: Subject to any disclaimer, the term of this patent is extended or adjusted under 35 U.S.C. 154(b) by 195 days.

(21) Appl. No.: 11/249,262

(22) Filed: Oct. 14, 2005

(65) Prior Publication Data
US 2006/0226293 A1 Oct. 12, 2006

Related U.S. Application Data

(60) Provisional application No. 60/656,084, filed on Feb. 25, 2005.

(51) Int. Cl.
*B64D 39/00* (2006.01)
*G01B 11/14* (2006.01)
(52) U.S. Cl. .................. 244/135 A; 356/601; 356/614
(58) Field of Classification Search ............... 356/601, 356/614–624, 3–6; 244/1 TD, 134 A, 134 R; 340/958; 398/140, 141, 151, 192
See application file for complete search history.

(56) References Cited

U.S. PATENT DOCUMENTS 1,315,721 A 9/1919 Hall (Continued)

FOREIGN PATENT DOCUMENTS

DE 33 11 349 A1 10/1984

(Continued)

OTHER PUBLICATIONS

"Guided Drogue Flight Test Report"; Technical Report No. E-23027; Beech Aircraft Corporation; Wichita, Kansas; *Naval Air Systems Command*; Sep. 6, 1977; p. 14.

(Continued)

*Primary Examiner*—Michael R Mansen
*Assistant Examiner*—Joseph W Sanderson
(74) *Attorney, Agent, or Firm*—William Scott Andes, Esq.; Armstrong Teasdale LLP

(57) ABSTRACT

An aerial refueling system including a refueling drogue assembly including a refueling drogue and a refueling hose in captive relation with the refueling drogue and a drogue positioning system. The drogue positioning system including a radiation emitter, a radiation receiver and a signal processor. Then the radiation emitter is adapted to direct radiation to a positioning area a defined distance from the radiation emitter, the radiation carrying a modulated location signal containing information corresponding to positions within the positioning area. The radiation receiver is adapted to receive at least a portion of the emitted radiation carrying the modulated signal and output a signal to the signal processor indicative of the modulation of the location signal of the received radiation. And the signal processor is adapted to process the outputted signal and identify a position within the positioning area indicative of the location in the positioning area of the received radiation.

27 Claims, 41 Drawing Sheets

U.S. PATENT DOCUMENTS

| | | | |
|---|---|---|---|
| 1,825,329 A | 9/1931 | Adams | |
| 2,317,622 A | 4/1943 | Lear | |
| 2,432,278 A | 12/1947 | Bratz | |
| 2,582,609 A | 1/1952 | Steele | |
| 2,596,455 A | 5/1952 | Williams et al. | |
| 2,692,103 A | 10/1954 | Cobham et al. | |
| 2,761,636 A | 9/1956 | Finlay | |
| 2,823,881 A | 2/1958 | Patterson | |
| 2,898,060 A | 8/1959 | Everhart | |
| 2,946,543 A | 7/1960 | Gordon | |
| 2,998,949 A | 9/1961 | Patterson | |
| 3,067,972 A | 12/1962 | Mosher | |
| 3,108,769 A | 10/1963 | Hieber | |
| 3,285,544 A * | 11/1966 | Chope et al. | 244/135 A |
| 3,310,257 A | 3/1967 | Price | |
| 3,398,916 A | 8/1968 | Vyve | |
| 3,603,533 A | 9/1971 | Stripling | |
| 3,704,070 A | 11/1972 | Johnson et al. | |
| 3,747,873 A | 7/1973 | Layer et al. | |
| 3,917,196 A * | 11/1975 | Pond et al. | 342/23 |
| 4,025,193 A | 5/1977 | Pond et al. | |
| 4,158,885 A | 6/1979 | Neuberger | |
| 4,710,028 A * | 12/1987 | Grenier et al. | 356/620 |
| 4,836,671 A * | 6/1989 | Bautista | 356/3.1 |
| 4,927,099 A | 5/1990 | Emerson et al. | |
| 5,029,773 A | 7/1991 | Lecat | |
| 5,078,406 A | 1/1992 | Luttrell et al. | |
| 5,102,145 A | 4/1992 | Luttrell | |
| 5,141,178 A | 8/1992 | Alden | |
| 5,183,224 A | 2/1993 | Harburg | |
| 5,186,413 A | 2/1993 | Deakin | |
| 5,224,663 A | 7/1993 | Criswell | |
| 5,326,052 A | 7/1994 | Krispin et al. | |
| 5,333,814 A | 8/1994 | Wallis | |
| 5,390,605 A | 2/1995 | Meili et al. | |
| 5,427,333 A | 6/1995 | Kirkland | |
| 5,497,156 A | 3/1996 | Bushman | |
| 5,499,784 A * | 3/1996 | Crabere et al. | 244/135 A |
| 5,530,650 A * | 6/1996 | Biferno et al. | 701/300 |
| 5,573,206 A | 11/1996 | Ward | |
| 5,871,173 A | 2/1999 | Frank et al. | |
| 5,904,729 A | 5/1999 | Ruzicka | |
| 5,921,294 A | 7/1999 | Greenhalgh et al. | |
| 5,947,051 A * | 9/1999 | Geiger | 114/313 |
| 6,056,236 A | 5/2000 | Wiemer et al. | |
| 6,091,345 A * | 7/2000 | Howard et al. | 340/958 |
| 6,119,981 A | 9/2000 | Young et al. | |
| 6,145,788 A | 11/2000 | Mouskis et al. | |
| 6,266,142 B1 | 7/2001 | Junkins et al. | |
| 6,375,123 B1 | 4/2002 | Greenhalgh et al. | |
| 6,464,173 B1 | 10/2002 | Bandak | |
| 6,588,465 B1 | 7/2003 | Kirkland | |
| 6,598,830 B1 | 7/2003 | Ambrose et al. | |
| 6,601,800 B2 | 8/2003 | Ollar | |
| 6,604,711 B1 | 8/2003 | Stevens | |
| 6,669,145 B1 | 12/2003 | Green | |
| 6,705,573 B2 | 3/2004 | McDonnell | |
| 6,752,357 B2 | 6/2004 | Thal et al. | |
| 6,775,480 B1 * | 8/2004 | Goodwill | 398/158 |
| 6,779,796 B2 | 8/2004 | Carlson et al. | |
| 6,786,455 B1 | 9/2004 | Bartov | |
| 6,801,722 B1 * | 10/2004 | Webb et al. | 398/156 |
| 6,824,105 B2 | 11/2004 | Edwards | |
| 6,869,043 B1 | 3/2005 | Carlyle et al. | |
| 6,886,773 B2 | 5/2005 | Peckham et al. | |
| 6,960,750 B2 * | 11/2005 | Doane | 250/206.1 |
| 6,994,294 B2 | 2/2006 | Saggio, III et al. | |
| 7,093,801 B2 * | 8/2006 | Schroeder | 244/135 A |
| 7,109,464 B2 * | 9/2006 | Cartlidge et al. | 250/208.1 |
| 7,298,500 B2 * | 11/2007 | Sato et al. | 356/614 |
| 7,385,168 B2 * | 6/2008 | Cartlidge et al. | 250/208.1 |
| 2002/0190162 A1 | 12/2002 | McDonnell | |
| 2003/0071164 A1 | 4/2003 | Carlson et al. | |
| 2003/0136874 A1 | 7/2003 | Gjerdrum | |
| 2004/0050998 A1 | 3/2004 | Edwards | |
| 2004/0069898 A1 | 4/2004 | Peckham et al. | |
| 2005/0007448 A1 * | 1/2005 | Kaltenbacher et al. | 348/42 |
| 2005/0178873 A1 | 8/2005 | Sullivan | |
| 2005/0269456 A1 | 12/2005 | Saggio, III et al. | |

FOREIGN PATENT DOCUMENTS

| | | |
|---|---|---|
| EP | 0 807 577 A | 11/1997 |
| FR | 2 736 614 | 7/1995 |
| GB | 916067 | 7/1961 |
| GB | 1 227 153 | 4/1971 |
| GB | 1 536 547 | 12/1978 |
| GB | 2 258 112 A | 1/1993 |
| GB | 2 309 952 A | 8/1997 |
| JP | 2000-292097 A | 10/2000 |
| WO | WO 02/055385 A1 | 7/2002 |

OTHER PUBLICATIONS

"Basics of Gyroscopes"; Carl Machover; *J.F. Ryder Pub.*; New York, 1960; pp. 2-99-2-108.

"Vision Based Sensor and Navigation System for Autonomous Aerial Refueling"; John Valasck et al.; *Texas A&M University*; Texas; pp. 1-9.

* cited by examiner

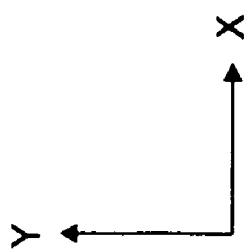
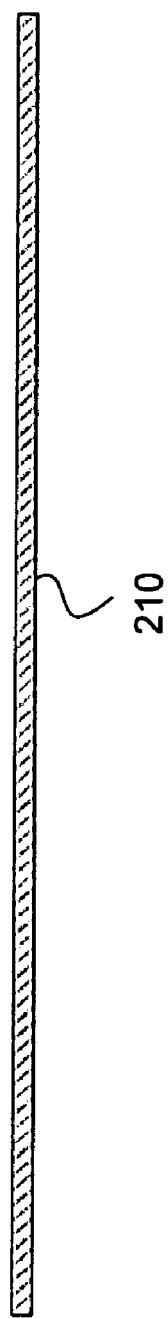
Fig. 7

US 7,681,839 B2

OPTICAL TRACKING SYSTEM FOR REFUELING

CROSS-REFERENCE TO RELATED PATENT APPLICATIONS

This patent application claims priority to U.S. Provisional Patent Application Ser. No. 60/656,084, entitled Optical Tracking System for Refueling, filed on Feb. 25, 2005, the contents of which are incorporated herein by reference in its entirety.

BACKGROUND OF THE INVENTION

Aerial refueling via the probe and drogue method is known. In an exemplary refueling scenario, a refueling drogue connected to a refueling hose is unreeled from a refueling aircraft (e.g., tanker aircraft) towards a receiver aircraft (an aircraft to be refueled), such as a fighter plane, a helicopter, etc. The receiver aircraft has a refueling probe extending from the aircraft. The receiver aircraft maneuvers to the refueling drogue and inserts its refueling probe into the refueling drogue, at which point the refueling drogue "locks" onto the refueling probe, and a transfer of fuel from the refueling aircraft to the receiver aircraft is conducted.

It is desirable that the drogue and the portion of the hose adjacent to the drogue remain as stationary as possible, at least relative to the refueling aircraft, when extended from the refueling aircraft, at least before contact between the drogue and the probe. Unfortunately, the hose-drogue combination has a relatively large dynamic response to disturbances, so when the drogue is subjected to wind gusts and/or turbulence, the hose-drogue combination moves relative to the refueling aircraft, as forces imparted onto the drogue by the air cause the drogue to move. Moreover, the aircraft to be refueled also creates what is called a bow wave in-front of the aircraft to be refueled, which imparts forces onto the drogue, causing the drogue to move. These phenomenon make it difficult to position the refueling probe of the aircraft to be refueled in the refueling drogue.

Thus, there is a need for a system that will substantially maintain the position of a drogue, relative to a refueling aircraft, that has been extended on a refueling hose so that the movement of the drogue resulting from wind/turbulence/bow wave, etc., is substantially reduced to improve the ease by which the refueling probe may be inserted in the refueling drogue.

SUMMARY OF THE INVENTION

An aerial refueling system comprising, a refueling drogue assembly including a refueling drogue and a refueling hose in captive relation with the refueling drogue and a drogue positioning system, the drogue positioning system including a radiation emitter, a radiation receiver and a signal processor, wherein the radiation emitter is adapted to direct radiation to a positioning area a defined distance from the radiation emitter, the radiation carrying a modulated location signal containing information corresponding to positions within the positioning area, wherein the radiation receiver is adapted to receive at least a portion of the emitted radiation carrying the modulated signal and output a signal to the signal processor indicative of the modulation of the location signal of the received radiation, and wherein the signal processor is adapted to process the outputted signal and identify a position within the positioning area indicative of the location in the positioning area of the received radiation.

In another embodiment of the invention, the radiation emitter is adapted to emit a focused optical beam and scan the focused optical beam over the positioning area.

In yet another embodiment of the invention, the emitted radiation is a focused optical beam, wherein the modulated location signal includes a plurality of digital data blocks, the plurality of digital data blocks containing information respectively corresponding to a plurality of discrete positions within the positioning area that respectively correspond to a current location of the focused beam within the positioning area.

In another embodiment of the invention, the radiation emitter is adapted to emit a focused optical beam and scan the focused optical beam over the positioning area.

In another embodiment of the invention, there is an aerial refueling system comprising a refueling drogue assembly including a refueling drogue and a refueling hose in captive relation with the refueling drogue, and a drogue positioning system, the drogue positioning system including a radiation emitter, a radiation receiver, and a signal processor, wherein the radiation emitter is adapted to direct a beam of emitted radiation to an area away from the radiation emitter, the radiation including discernable properties that vary in a corresponding manner with varying orientation of the beam of radiation with respect to the radiation emitter, wherein the radiation receiver is adapted to receive at least a portion of the emitted radiation and output a signal to the signal processor indicative of one or more of the discernable properties of the received radiation; and wherein the processor is adapted to process the outputted signal and identify a first virtual orientation indicative of an orientation of the receiver relative to the radiation emitter when at least a portion of the radiation was received by the receiver.

BRIEF DESCRIPTION OF THE DRAWINGS

FIG. 7 is a view of a focused optical elongated beam emitted by the radiation emitter impinging on a flat surface.

DETAILED DESCRIPTION OF THE PREFERRED EMBODIMENTS

The present invention is directed towards systems, methods and apparatuses for enabling a drogue in general and a refueling drogue in particular to determine its position relative to a fixed referenced point on the aircraft to which the drogue is coupled (e.g., refueling aircraft). Moreover, the present invention is directed towards systems, methods and apparatuses for enabling a drogue in general and a refueling drogue in particular to substantially maintain a position relative to the fixed reference point (also known as station keeping) based on this determined position. In exemplary embodiment, this fixed reference point is a radiation emitter on the wing of the refueling aircraft, as will be discussed below. An exemplary embodiment of the present invention, coupled with exemplary scenarios utilizing the present invention, will now be described followed by detailed discussions of particular embodiments of the present invention.

Figure 1:
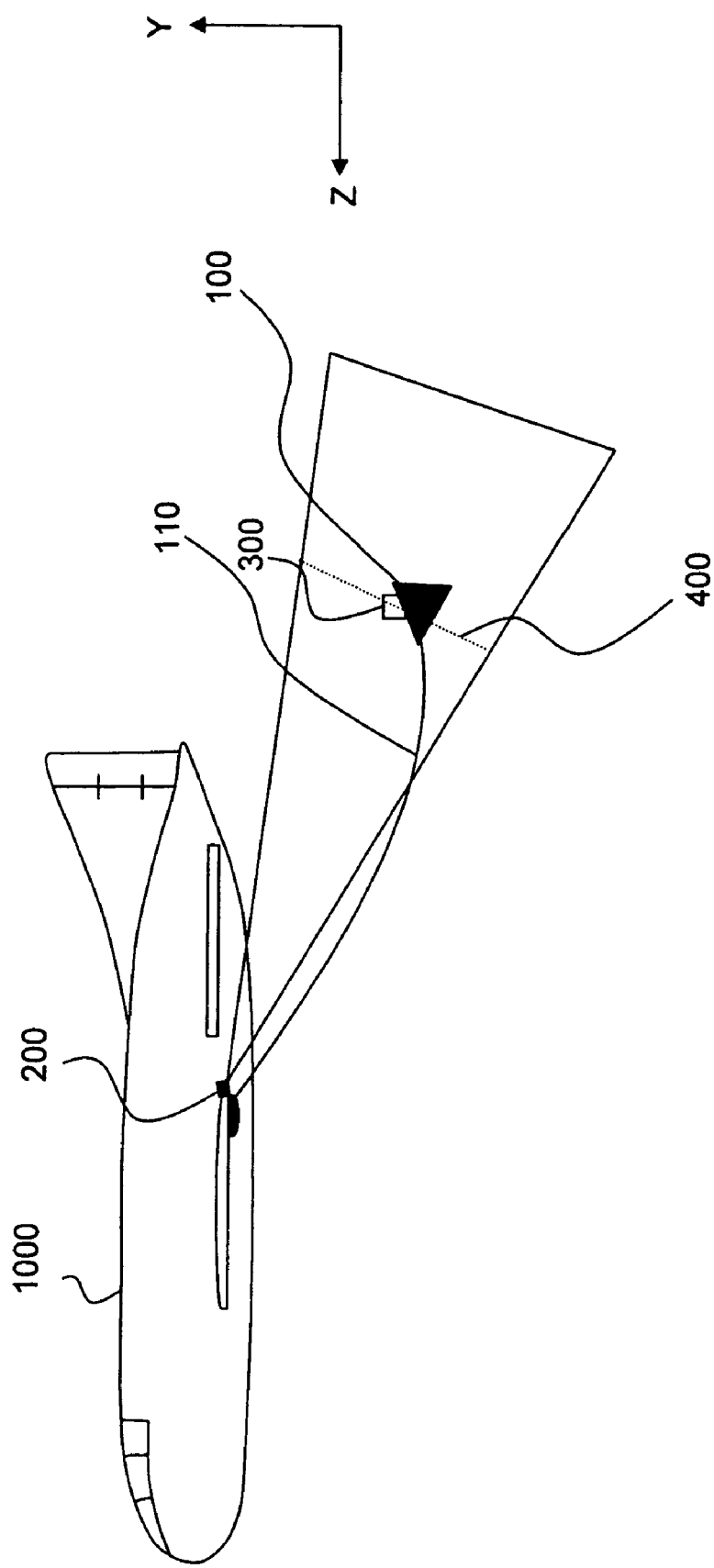
FIG. 1 is a side view of an aerial refueling operation according to the present invention.
Figure 2:
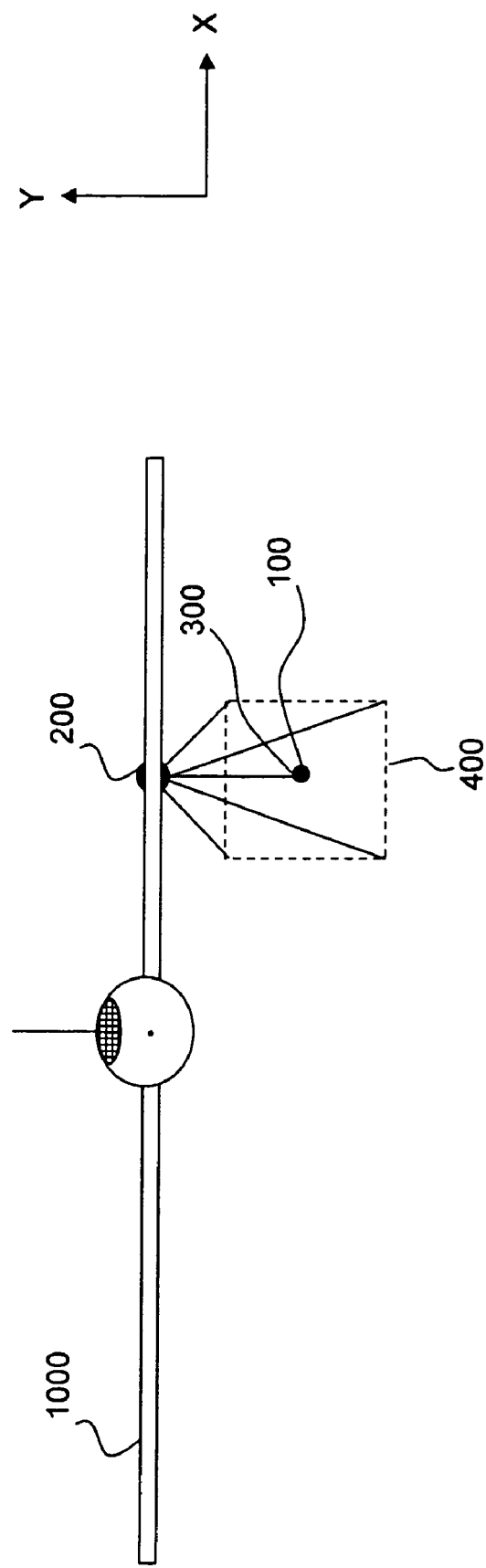
FIG. 2 is a front view of an aerial refueling operation according to the present invention.
Figure 3:
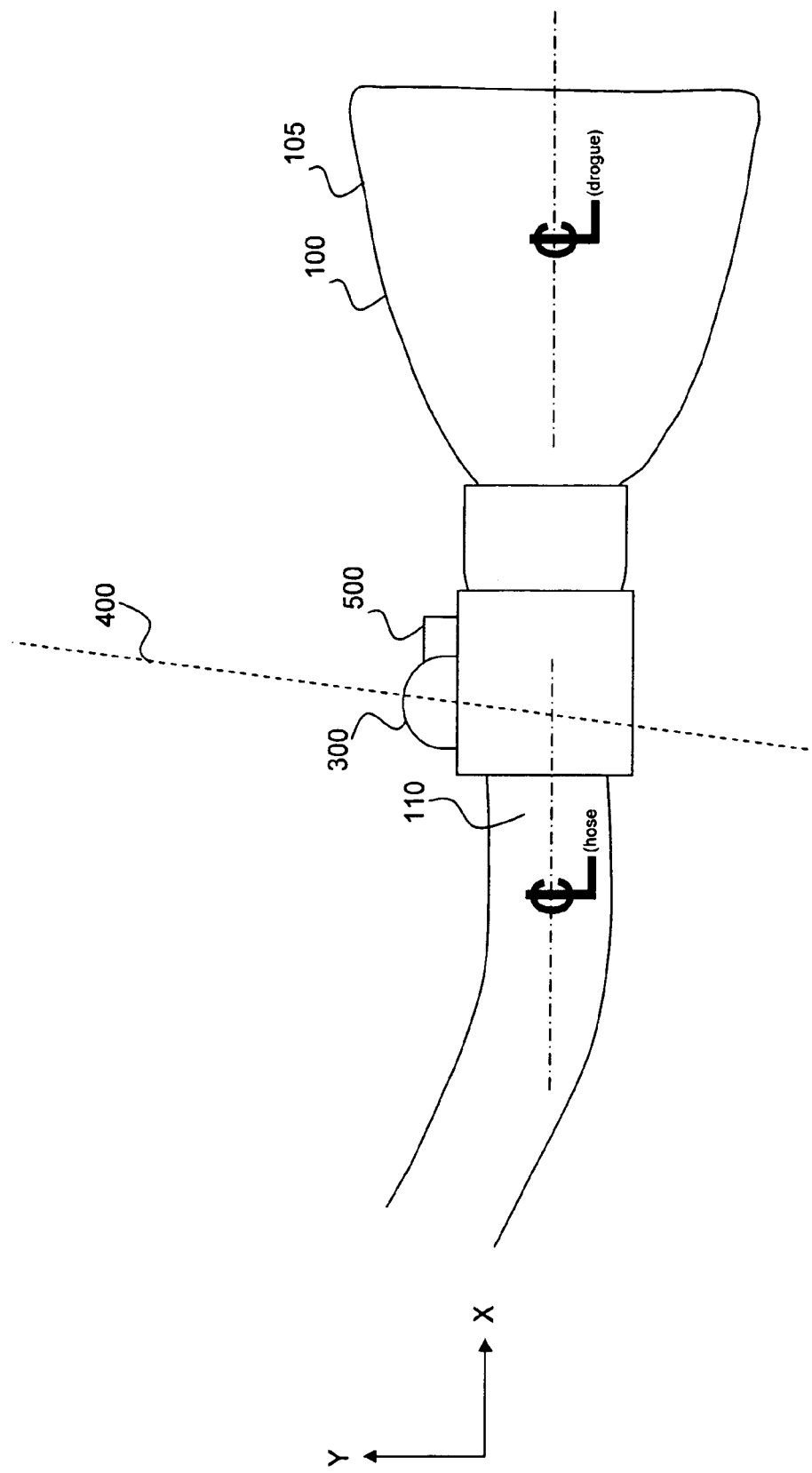
FIG. 3 is a side view of a drogue assembly according to the present invention.

In a first embodiment of the present invention, as may be seen in FIGS. 1-3, there is a refueling drogue assembly 100 comprising a refueling drogue 105 connected to a distal portion of a refueling hose 110 (with respect to the attachment of the hose 110 to the aircraft 1000) that is in turn connected to an aircraft 1000. The aircraft 1000 includes a radiation emitter 200 that emits an optical beam in the general direction of the drogue assembly 105 (in particular, towards the receiver 300 on the drogue assembly 105, as will be discussed below). The beam is emitted in a scanning fashion such that the beam scans an area in relation to the radiation emitter in which the drogue 105 (receiver 300) is likely located, based on, for example, empirical data/analytical data for a given air speed, altitude, etc. This area is indicated by reference number 400 in FIGS. 1-3. The optical bean emitted by the radiation emitter 200 scans this area in a manner such that a discernable property of the optical beam changes as the orientation of the beam, with respect to the radiation emitter 200, changes. The discernable property of the optical beam that varies, in a controlled manner, with changing orientation of the beam with respect to the radiation emitter may be, for example, different discrete digital data blocks carried on the beam by way of beam modulation.

Accordingly, in an exemplary scenario utilizing the present invention, the optical beam scans over the scanning area 400 in a manner such that a discernable property of the optical beam changes as the beam is scanning over the scanning area. That is, the discernable property is different when the beam is located at one portion of the scanning area, as opposed to another portion of the scanning area, owing to the change in orientation of the beam with respect to the radiation emitter and the scanning area. This discernable property is carried on the optical beam and changes in a predetermined manner such that an analysis of this discernable property will enable the location of the beam, relative to the scanning area, to be determined. In this scenario, the radiation receiver 300 on the drogue assembly 100 is configured to output a signal to a signal processor 500 (after receiving/sensing the optical beam as it passes over the receiver) onboard the drogue assembly 100. This outputted signal from the receiver 300 is indicative of the discernable property carried on the optical beam that is received by the receiver. The signal processor 500 contains software and/or sufficient look up tables stored in a memory such that the signal processor 500, once it receives the signal from the receiver 300, may analyze the received signal and determine that the discernable property is indicative of a specific beam orientation with respect to the radiation emitter 200 and the scanning area 400. Because the geometry of the scanning area 400 relative to the radiation emitter is known, the location of the receiver 300 within the scanning area 400 may thus be determined by comparing the discernable property of the received radiation to information stored in a look-up table. Because the geometry of the refueling drogue assembly 100 relative to the receiver 300 is known, the position of the drogue assembly 100 relative to the radiation emitter may be determined.

As may be seen from FIGS. 1-3, the scanning area 400 is a square area in space that passes through the receiver 300 on the refueling drogue assembly 100. This area 400 is approximately normal to the direction of travel of the focused beam away from the radiation emitter (this is discussed in greater detail below).

Scanning

Figure 4:
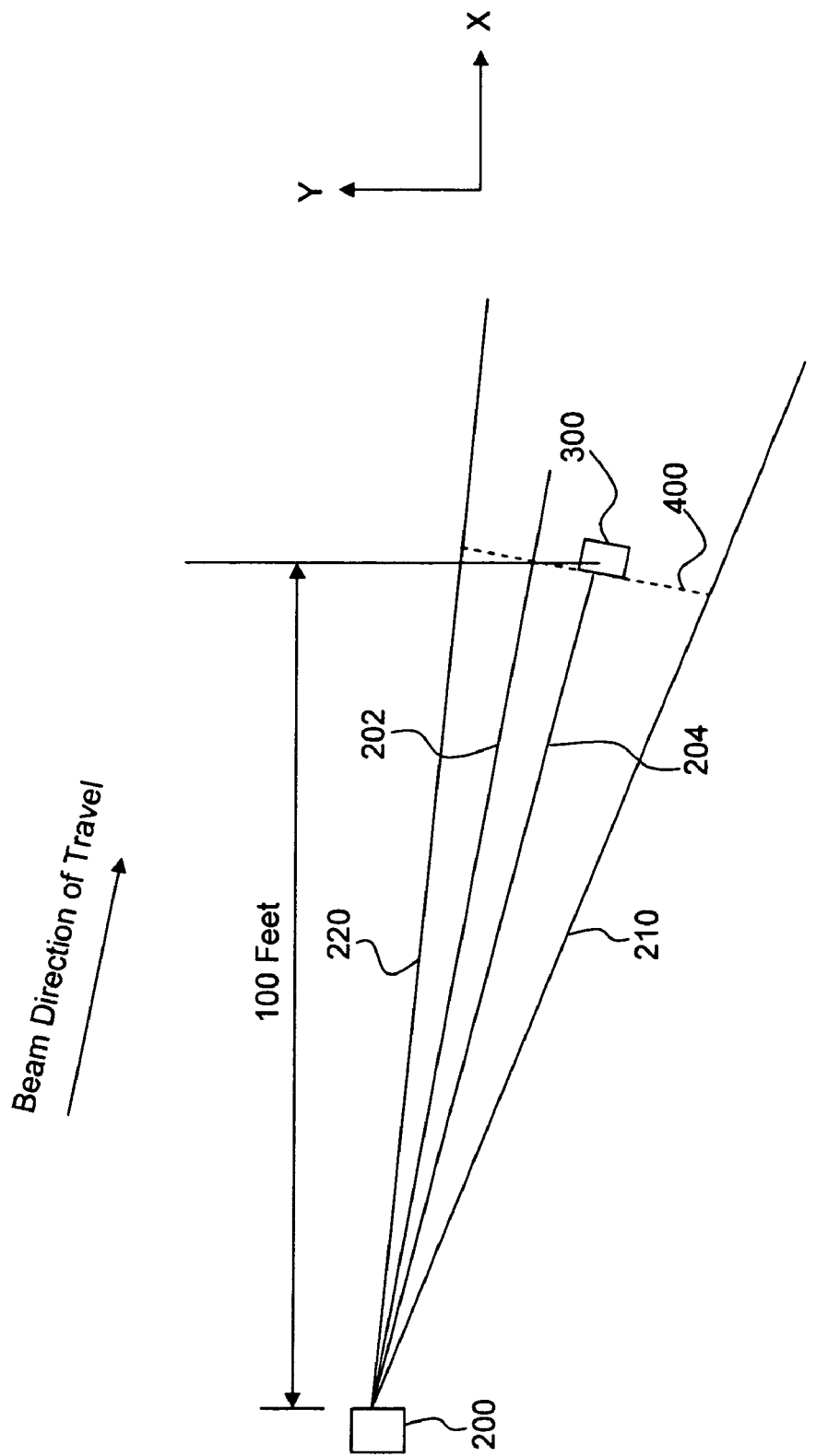
FIG. 4 is a side view of a scanning operation according to the present invention.
Figure 5:
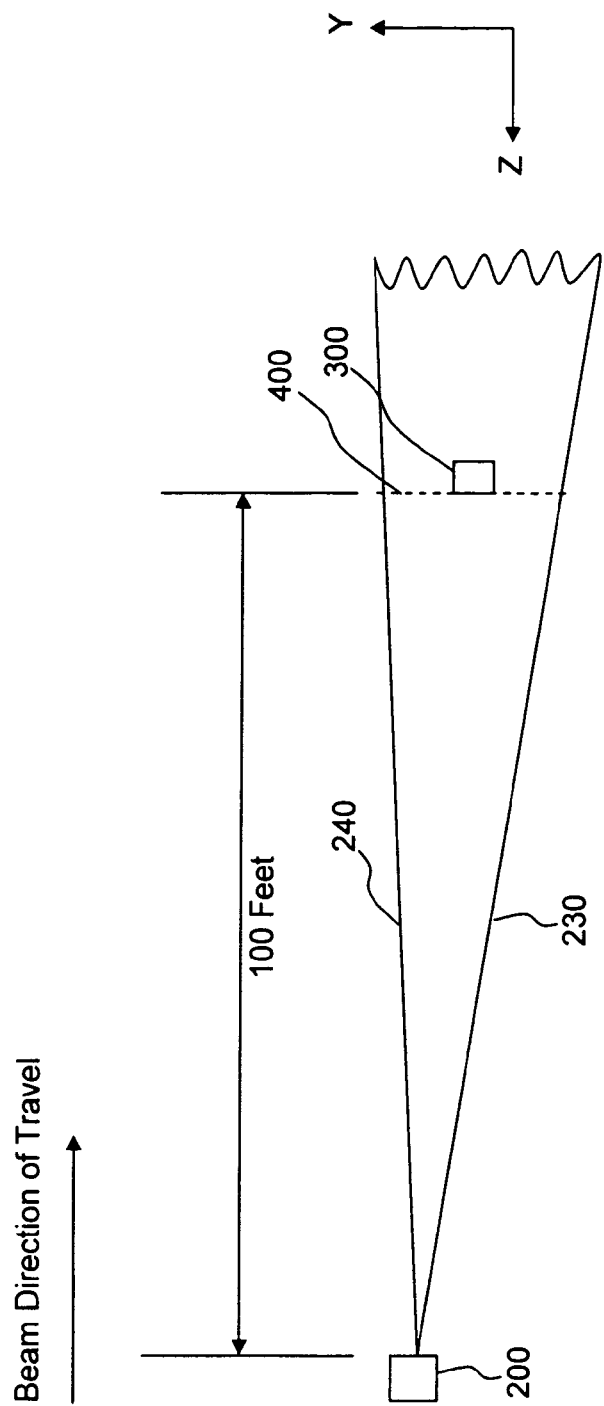
FIG. 5 is a top view of a scanning operation according to the present invention.

The operational characteristics of the radiation emitter 200 shall now be described. FIG. 4 depicts a side view of an exemplary embodiment of the radiation emitter 200 and receiver 300 arrangement. FIG. 4 is taken from the perspective view depicted in FIG. 1. FIG. 4 shows that radiation emitter 200 emits a focused optical beam and moves that beam within lines 210 and 220. That is, from the side view of FIG. 4, radiation emitter 200 emits a beam in a scanning fashion such that the beam moves within the area bounded by lines 210 and 220 so that the scanning area 400 may be scanned. By way of example only and not by way of limitation, the radiation emitter 200 may emit a beam 202 at the orientation depicted in FIG. 4 at a time $T_1$, and then at a later time $T_2$, emit a beam 204 at a different orientation from that of beam 202. It is noted that in FIG. 4, the beam 202 is not intercepted by the receiver 300, whereas the beam 204 is intercepted by the receiver 300. FIG. 5 shows a top view of the radiation emitter 200 and the receiver 300 depicted in FIG. 4. From FIG. 5, it can be seen that the radiation emitter 200 emits beams within the area bounded by line 230 and line 240. Recognizing that FIG. 4 is a side view of the system and FIG. 5 is a top view of the system, a comparison of FIG. 4 with FIG. 5 shows that the volume (herein referred to as a scan zone and/or beam zone) bounded by lines 210 and 220 in FIG. 4 and lines 230 and 240 in FIG. 5 is in the shape of a cone, having its "top" located at the receiver 200. In the embodiment depicted in the Figs., the beam may be found within this volume/scan zone. In the embodiment depicted in FIGS. 4 and 5, the cone has a rectangular/square cross-section, as may be seen in FIG. 2. Thus the scanning area 400 will be rectangular/square shaped. (However, other embodiments of the present invention may utilize a circular cross-section or an oval shape cross-section. Indeed any shaped cross-section may be utilized as long as the goals of the present invention may be obtained.) It is noted that the exact geometry of this scanning area may not be perfectly square/rectangular in view of the fact that the distance from the receiver 200 to the scanning area changes with changing angular orientation of the beam with the radiation emitter 200. This phenomenon is discussed in greater detail below. However, for the present discussion, the scanning area will be treated as a rectangular/square shape that is approximately normal to direction of beam travel away from the radiation emitter 200. It is further noted that in many embodiments of the present invention, the beam will travel passed the scanning area 400, if the beam is not intercepted by the receiver 300. However, some embodiments of the present invention are such that the beam does not travel a significant distance beyond the receiver 300 so that the beam may not be easily detected beyond close proximity to the refueling aircraft 1000.

Figure 6:
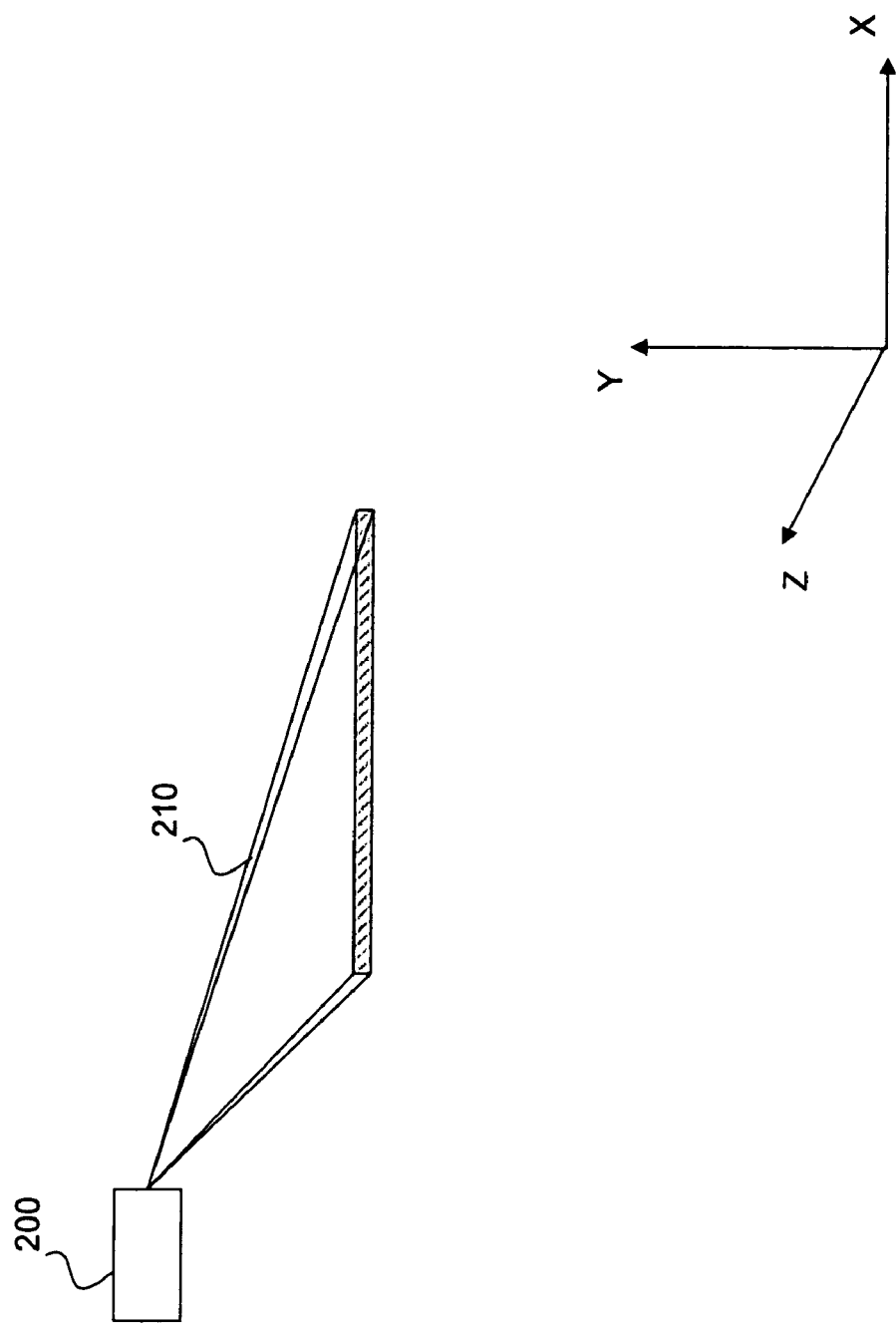
FIG. 6 is a view of a focused optical elongated beam emitted by the radiation emitter.
Figure 8:
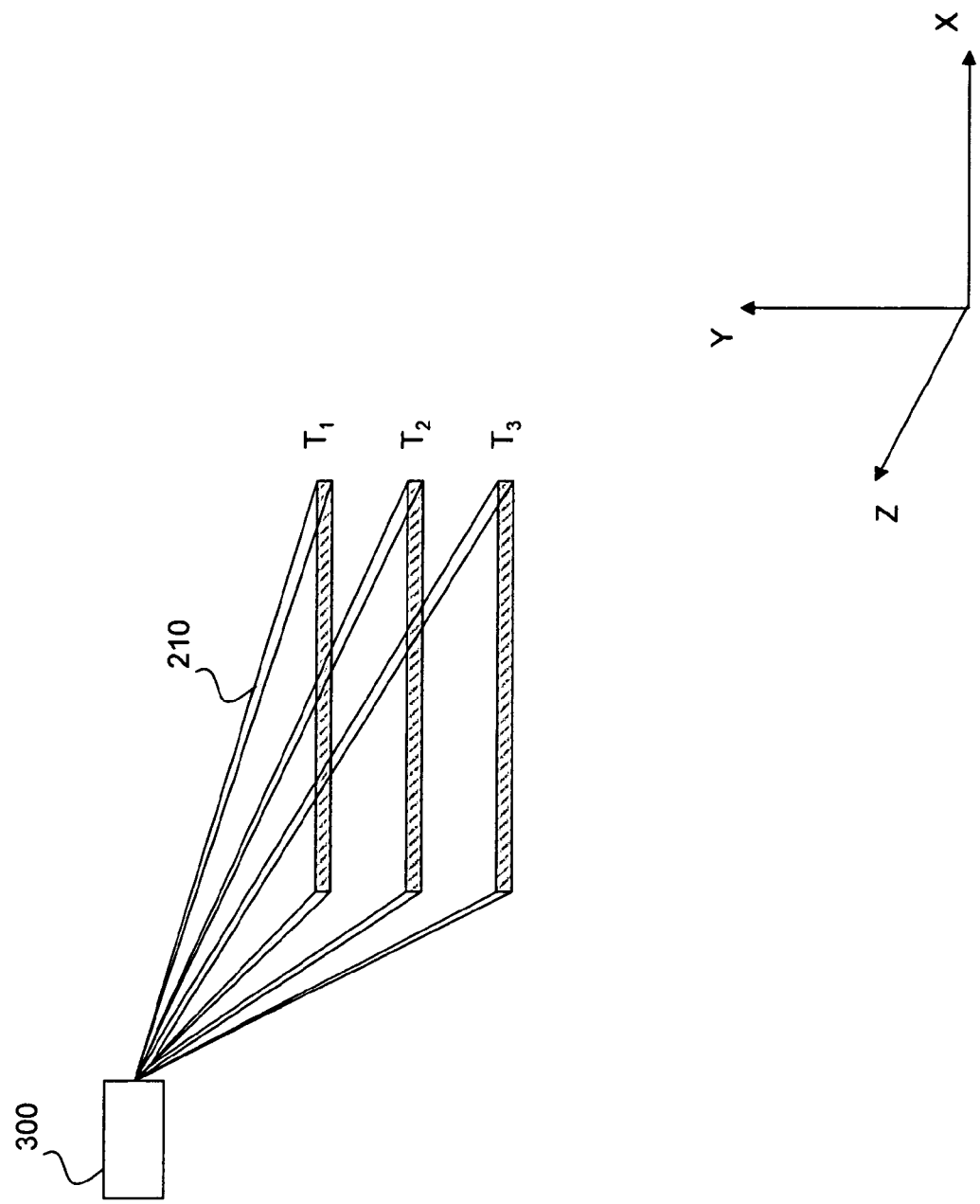
FIG. 8 is a view of a focused optical elongated beam emitted by the radiation emitter over an elapsed time.
Figure 9:
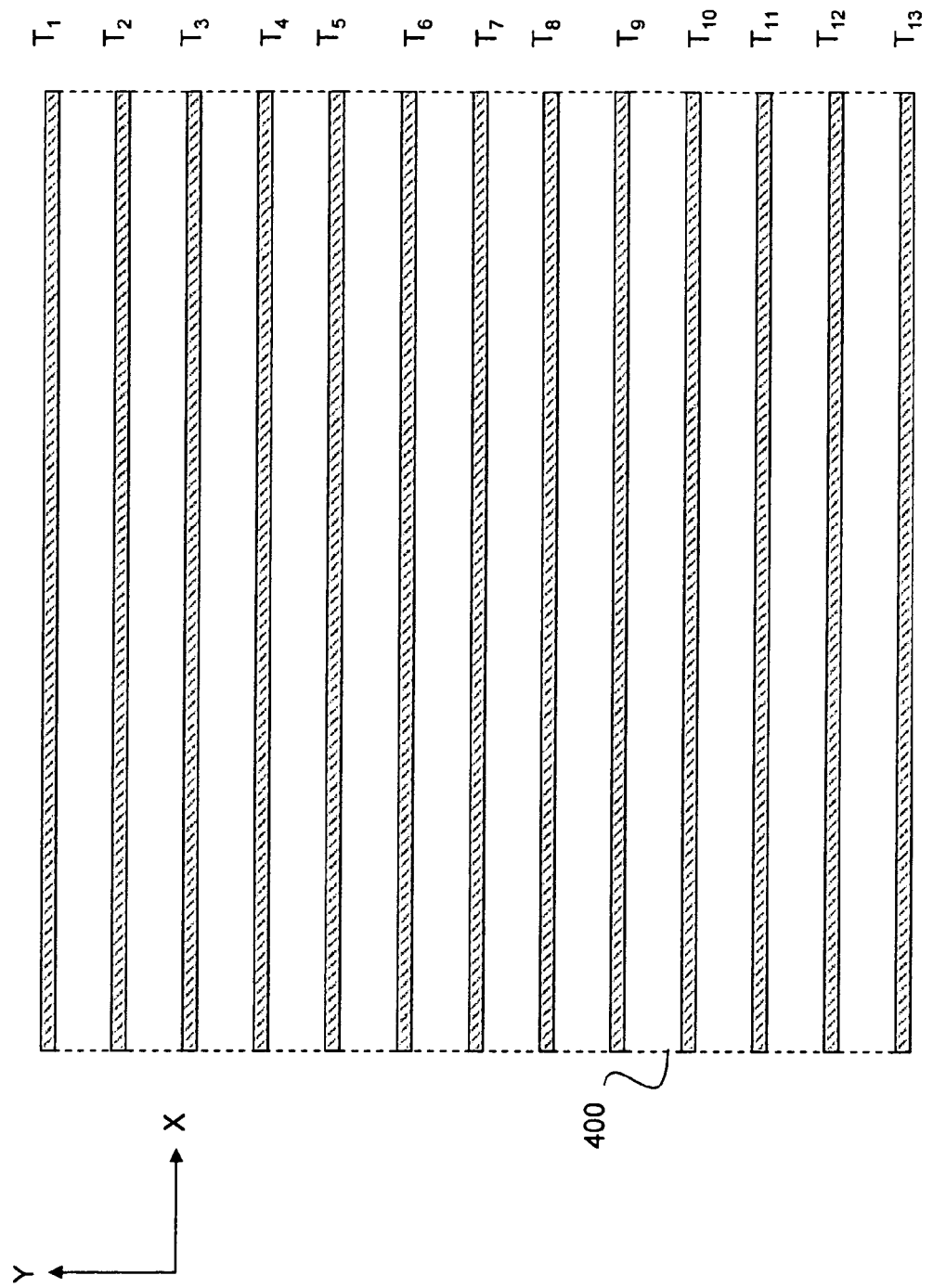
FIG. 9 is a view of a focused optical elongated beam emitted by the radiation emitter impinging on a flat surface over an elapsed time.

In a first embodiment of the invention, the radiation emitter 300 emits a focused optical beam that is a focused optical elongated beam 210 and scans the beam over the scanning area, as may be seen in FIG. 6. FIG. 7 shows the beam from the perspective of the scanning area, which is approximately normal to the direction of travel of the beam. That is, if the scanning area was a flat surface, and the beam 210 impinged upon the flat surface, the beam would look approximately like that shown in FIG. 7 when viewed in the direction of beam travel. In a first exemplary embodiment, the radiation emitter 300 first scans the focused optical elongated beam 210 over the scanning area starting from the top of the scanning area and ending at the bottom of the scanning area, in increments, as may be seen, for example, in FIG. 8. (Note that in other embodiments, the scanning may begin at the bottom and/or at the left or right sides (discussed below) and/or at any other location within the scanning area.) FIG. 8 shows, in a time-elapsed fashion, that at $T_1$, the beam 210 is at a first position. At $T_2$, the beam 210 is moved to a second position below $T_1$. At $T_3$, the beam 210 is moved to a third position below $T_2$. Again, the beam depicted in FIGS. 6-8 show the result of the focused optical beam as it would be if the beam impinges on the scanning area 400. FIG. 9 shows the focused optical beam impinging upon the scanning area over times $T_1$ through $T_{13}$ in a time-elapsed manner.

Figure 10:
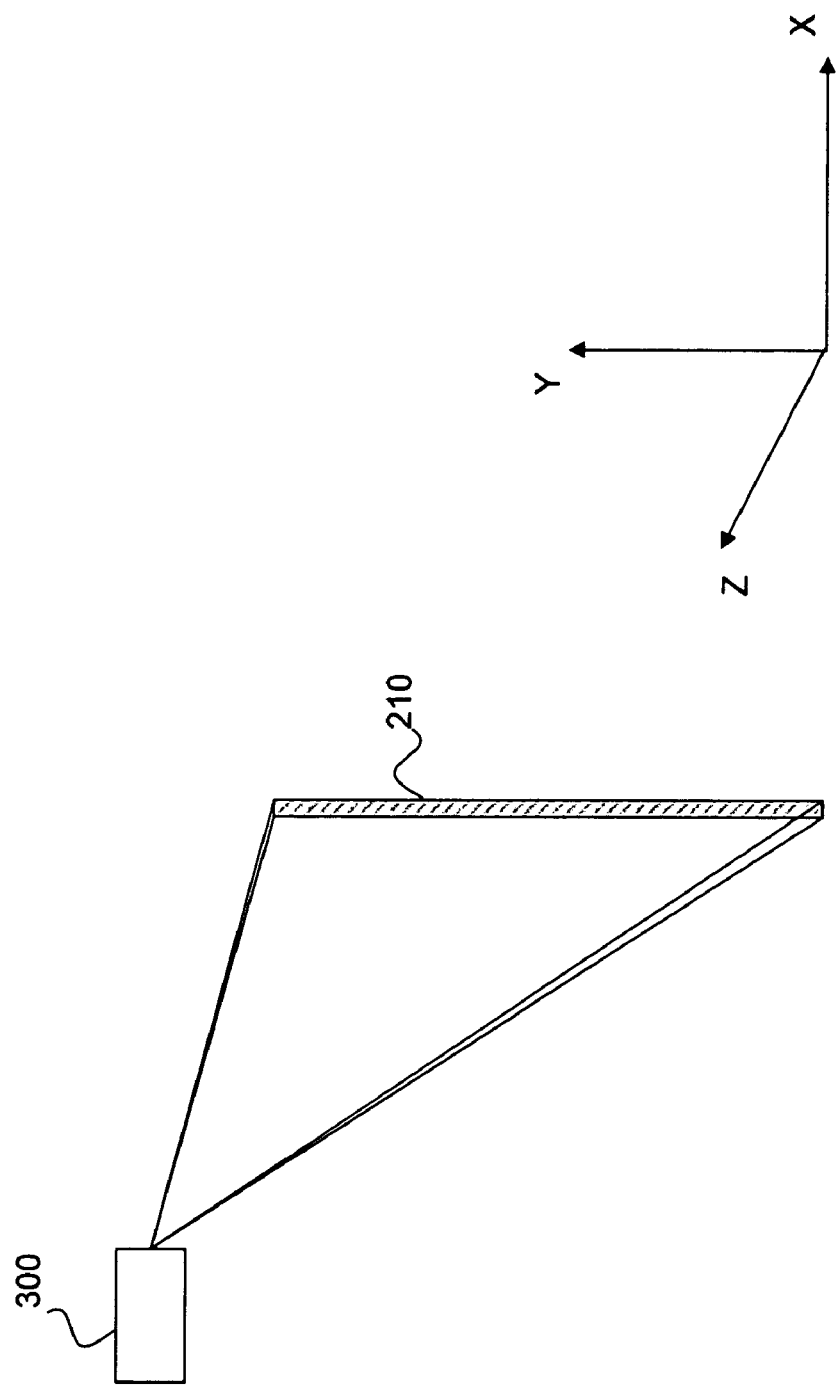
FIG. 10 is a view of a focused optical elongated beam emitted by the radiation emitter.
Figure 11:
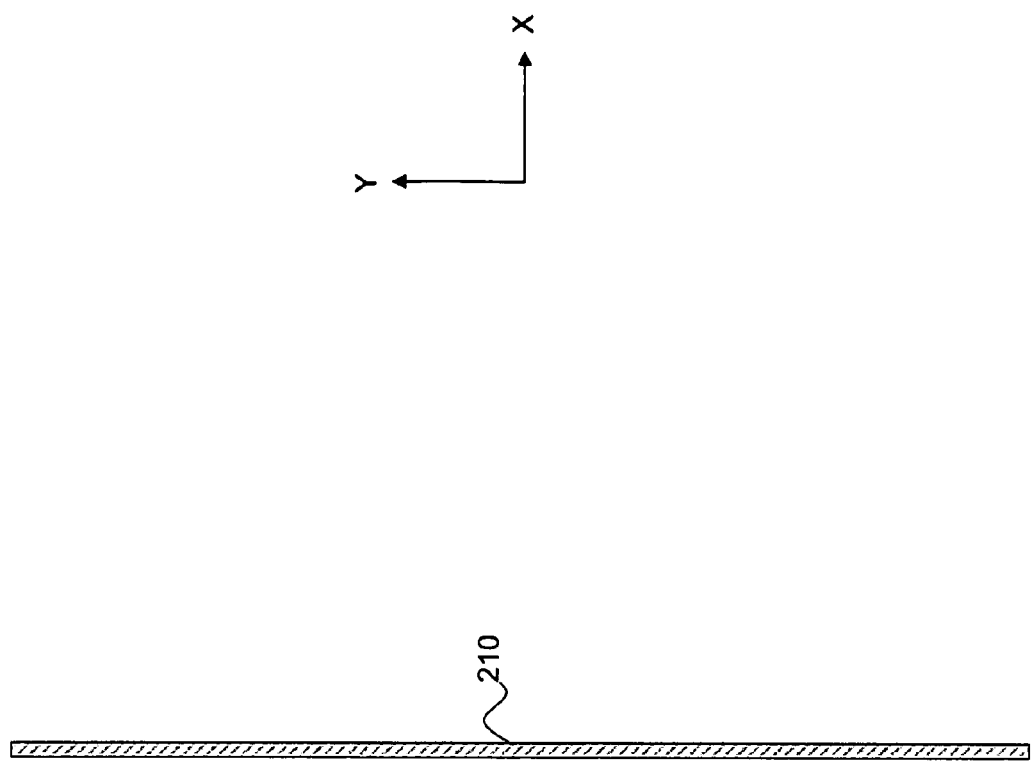
FIG. 11 is a view of a focused optical elongated beam emitted by the radiation emitter impinging on a flat surface.
Figure 12:
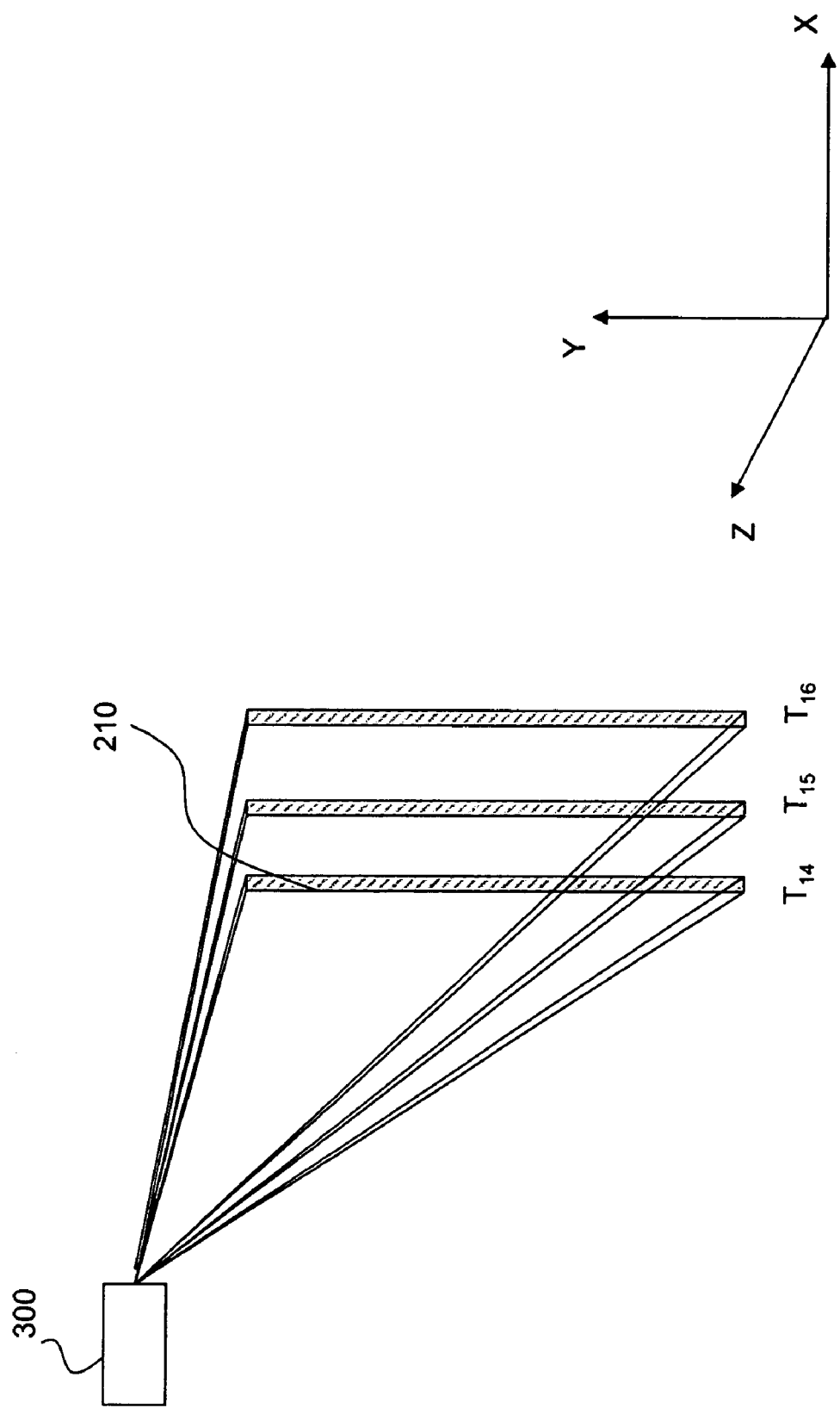
FIG. 12 is a view of a focused optical elongated beam emitted by the radiation emitter over an elapsed time.
Figure 13:
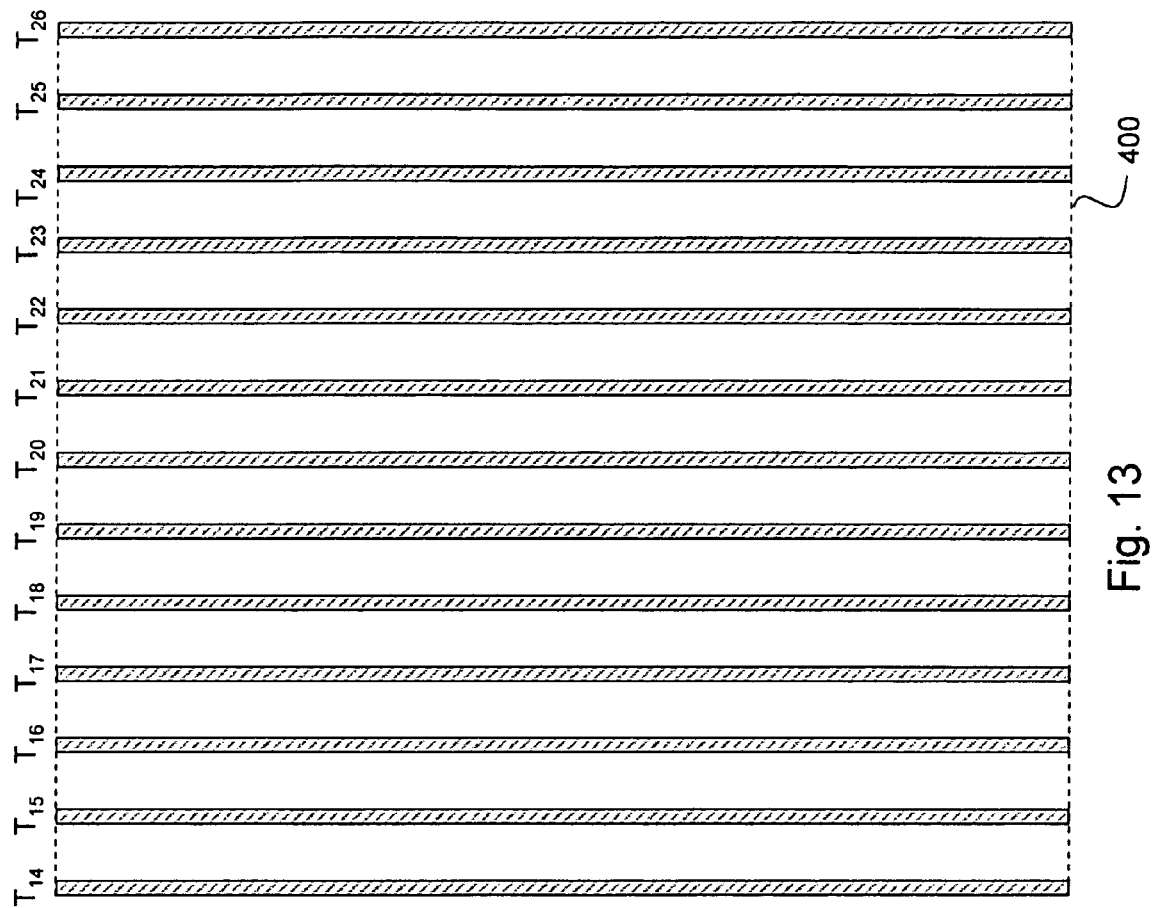
FIG. 13 is a view of a focused optical elongated beam emitted by the radiation emitter impinging on a flat surface over an elapsed time.

After scanning from the top of the scanning area to the bottom of the scanning area, the radiation emitter changes the orientation of the focused optical beam 210 from a horizontal orientation to a vertical orientation, as may be seen in FIG. 10. FIG. 11 shows the "impingement" of the beam 210 on the scanning area when the beam is elongated in the vertical direction. As may be seen in FIG. 12, radiation emitter 300 scans the beam 210 over the scanning area 400 starting from left to right, in increments. That is, at time $T_{14}$, the elongated beam impinges upon the scanning area in the left-most position. At $T_{15}$, the beam is moved from the left-most position to a position to the right. At $T_{16}$, the beam is again moved further to the right. FIG. 13 shows a time elapsed view of beam impingement over the scanning area from time $T_{14}$ to time $T_{26}$.

Thus in comparing FIG. 13 with FIG. 9, it may be seen that the radiation emitter passes the beam over the scanning area in a two-pass or a dual-pass manner: first from top to bottom, and then from left to right (or from left to right, and then from top to bottom, etc.)

Positioning Coordinate System

Figure 14:
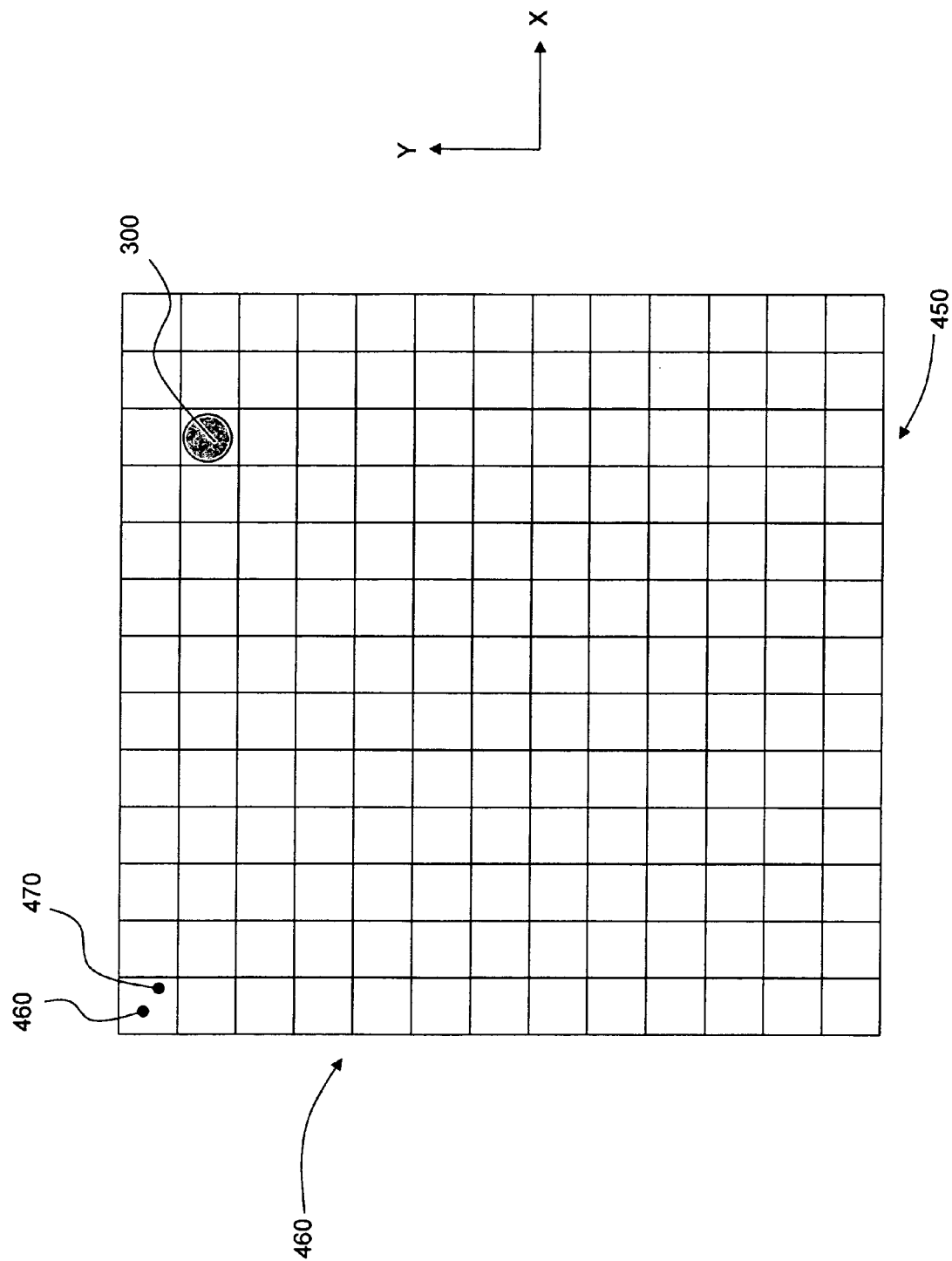
FIG. 14 is a view of a virtual grid.
Figure 15:
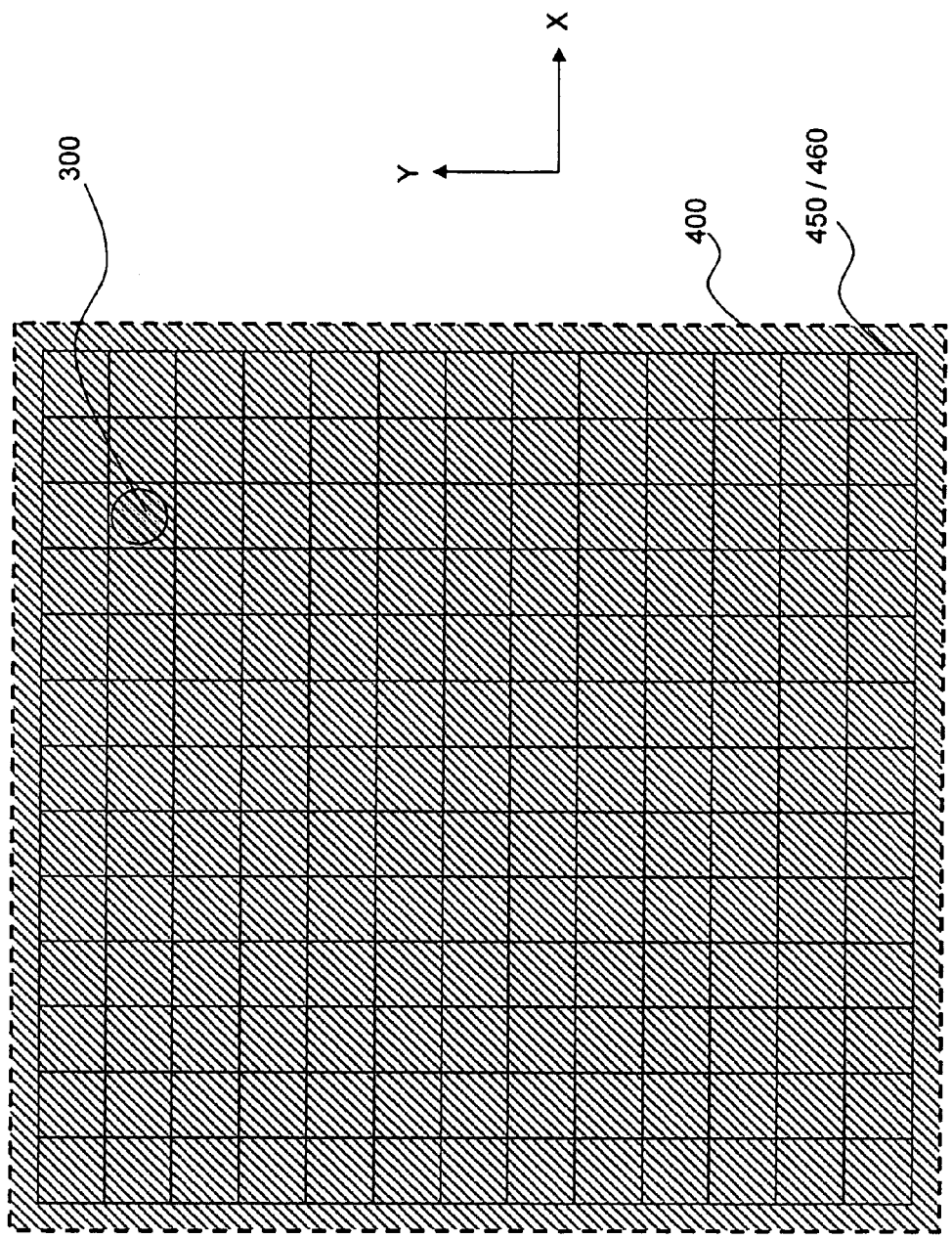
FIG. 15 is a view of a virtual grid superimposed over a scanning area.

According to a first embodiment of the present invention, at least a portion of the scanning area 400 includes a positioning area 450, as may be seen in FIGS. 14 and 15, in which the receiver 300 is likely to be located. In this embodiment of the invention, this positioning area 450 is entirely within the scanning area 400, as may be seen in FIG. 15, and thus the optical beam is scanned over the entire positioning area 450. However, in other embodiments, the boundaries of the positioning area 450 may exceed the scanning area 400.

Figure 16:
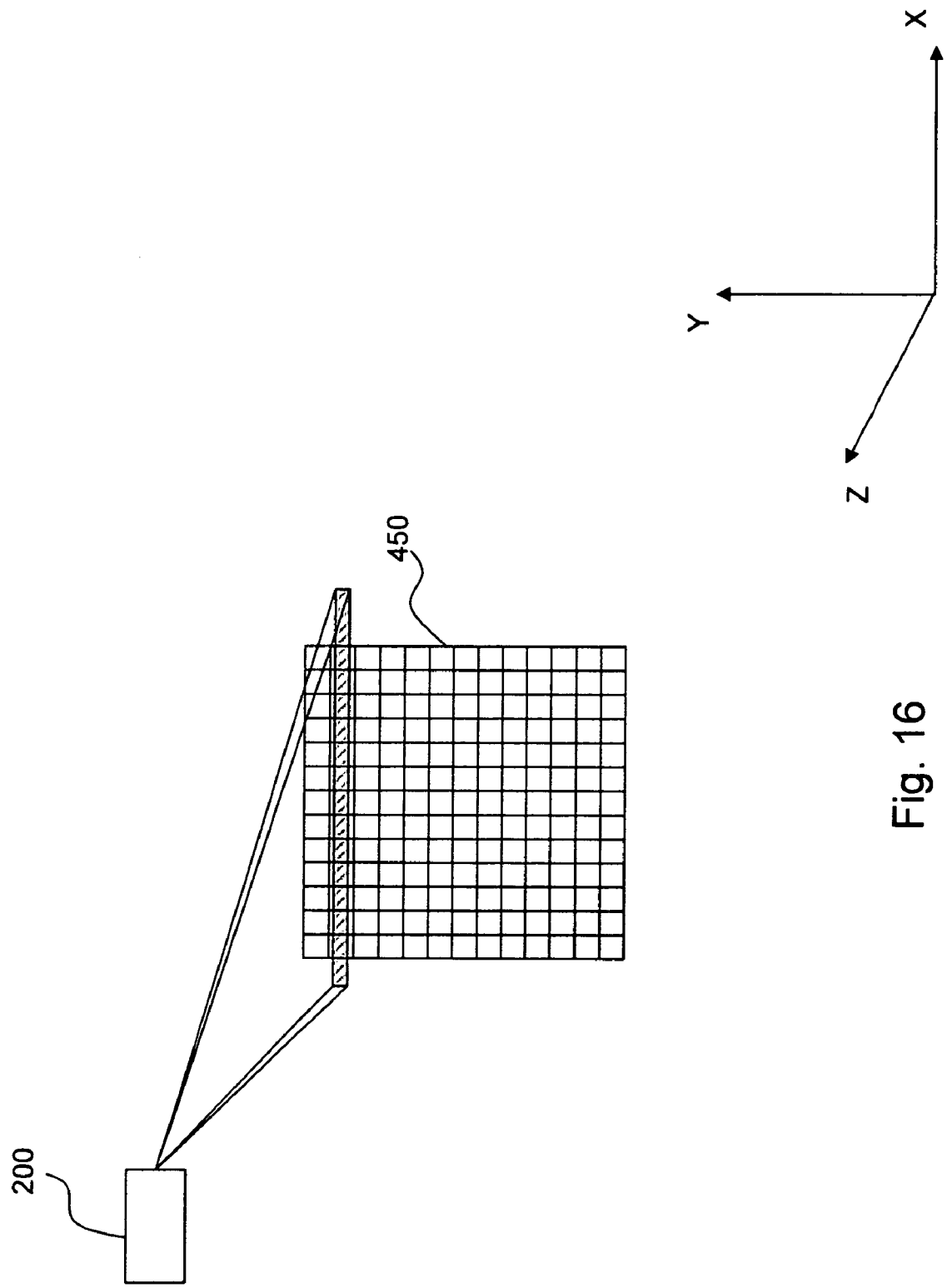
FIGS. 16-17 present a schematic representing a two-pass scan over the virtual grid.
Figure 17:
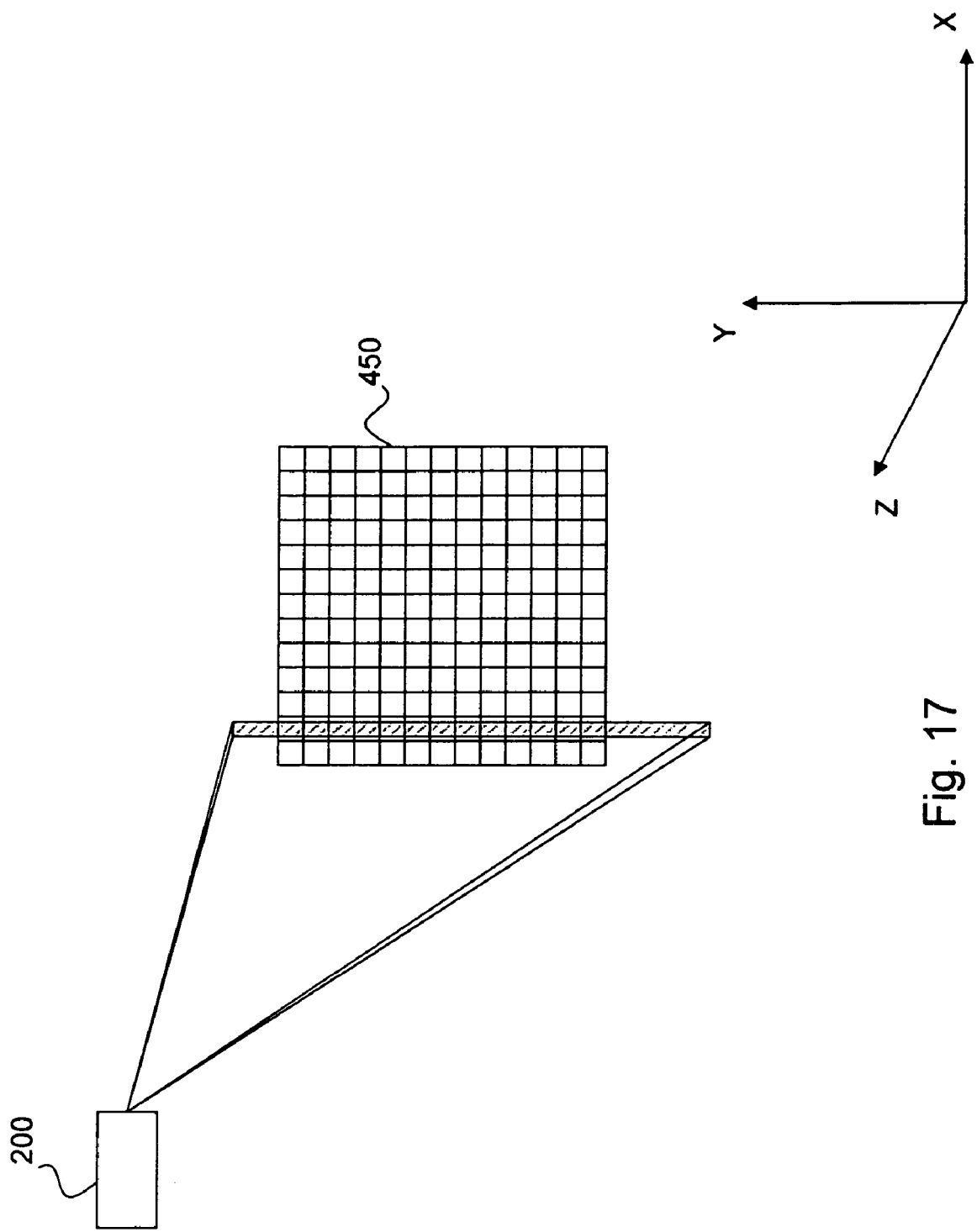

The drogue positioning system is adapted virtually divide at least a portion of this positioning area 450 into a virtual grid 460. The virtual grid may include a plurality of distributed distinct sectors that spatially correspond to sub-areas within the positioning area. The sub-areas are dispersed within the positioning area in a geometrically defined manner. As may be seen in FIG. 15, receiver 300 of the refueling drogue assembly, during normal operation of the drogue positioning system, is typically located within this positioning area, and thus the receiver 300 will receive radiation from the radiation emitter, during normal operational conditions, as the radiation passes over the receiver. FIG. 16 shows a focused optical elongated beam in the horizontal position scanning over a row of distinct sectors/sub-areas within the virtual grid/positioning area 460/450. In a first embodiment of the present invention, the focused optical elongated beam scans from top to bottom in a continuous or in a step-wise manner, such that the focused optical elongated beam is scanned over each row of distinct sectors/sub-areas. After scanning over all of the rows, the focused optical elongated beam is then focused to be elongated in the vertical direction and is scanned over the positioning area, from column to column, again either in a step-wise or a continuous manner (see FIG. 17). As the optical beam moves from row to row and from column to column, the discernable property of the beam changes in a manner that may be detected by the receiver 300. That is, were the receiver to detect a discernable property of the horizontal beam while in, for example, the second row (that is, the discernable property corresponds to horizontal beam positioning within the second row), the radiation receiver will be able to detect a different discernable property were the beam and the receiver in the third row and so on. As noted above, the receiver is adapted to output a signal that is indicative of the discernable property of the received radiation, to convey information to the signal processor 500.

Drogue (Receiver) Positioning

Figure 18:
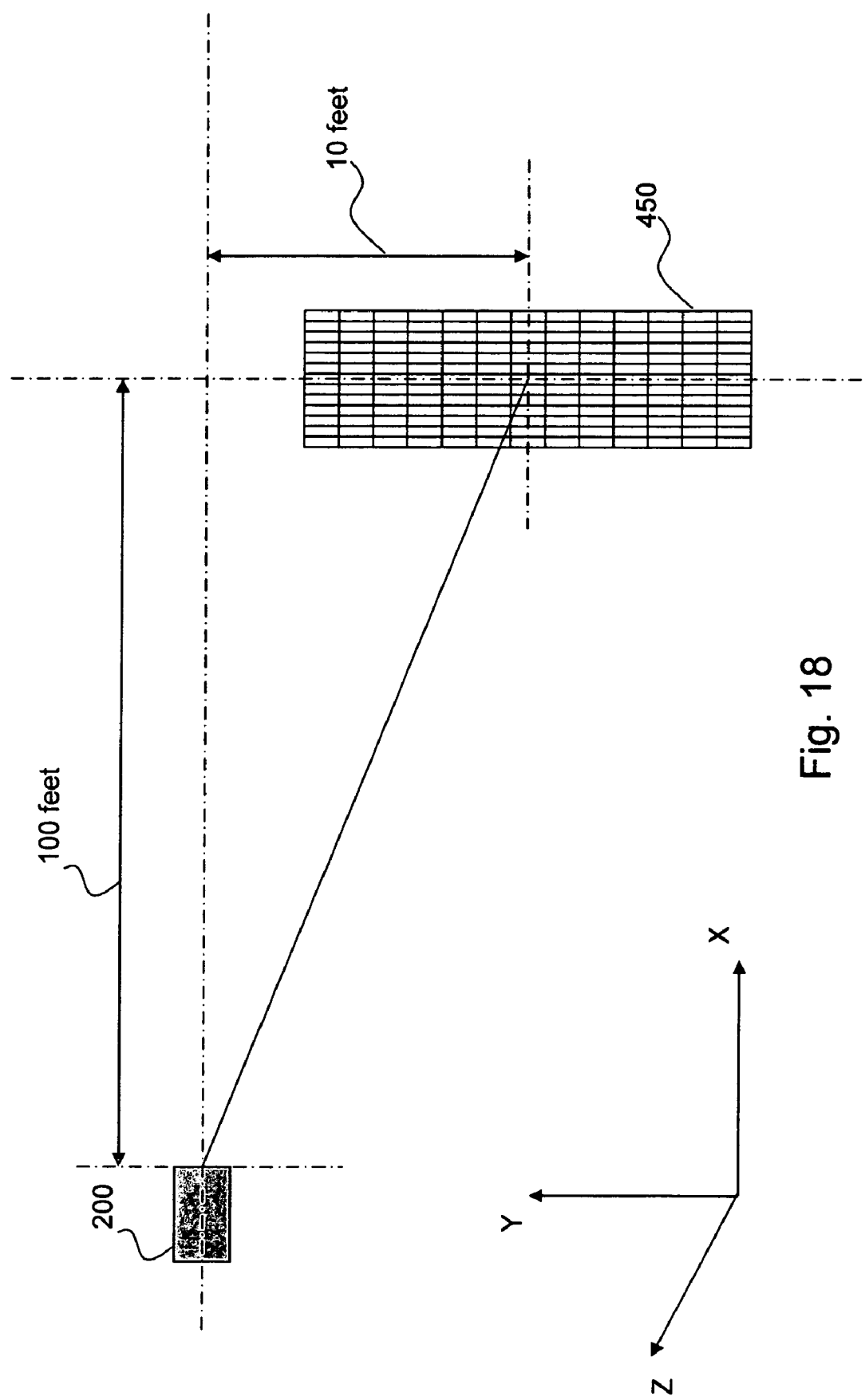
FIG. 18 depicts a location of the virtual grid with respect to the radiation emitter.

As noted above, the distributed distinct sectors of the positioning area correspond to sub-areas within the positioning area, the sub-areas being disbursed within the positioning area in a geometrically defined manner. This geometrically defined manner corresponds to a known orientation of the sub-areas with the radiation emitter 200. Therefore, the orientation of the virtual grid 460 with respect to the radiation emitter is known. By way of example and not by limitation, FIG. 18 shows that the center of the grid 450 is located 100 feet behind and 10 feet below the receiver 300. (The center of the grid 450 is centered with the radiation emitter 300—i.e. the "X" value is 0.)

Because the orientation of the scanning area/virtual grid with respect to the radiation emitter 300 is known, the discernable property of the optical beam may be changed to correspond to the particular distinct sectors/sub-areas within the positioning area such that a unique discernable property may be carried on the optical beam for each distinct sector/sub-area. In this manner, the receiver 300, having received the radiation from the radiation emitter 200 outputs the signal to the signal processor 500 indicative of the distinct property carried on the optical beam received by the receiver 300, and thus, depending on the discernable property of the received radiation received by the receiver 300, by comparing the received discernable property to those in, for example, a memory, the signal processor 500 can determine which particular distinct sector/sub-area the receiver was located in when the receiver received the radiation.

Figure 19:
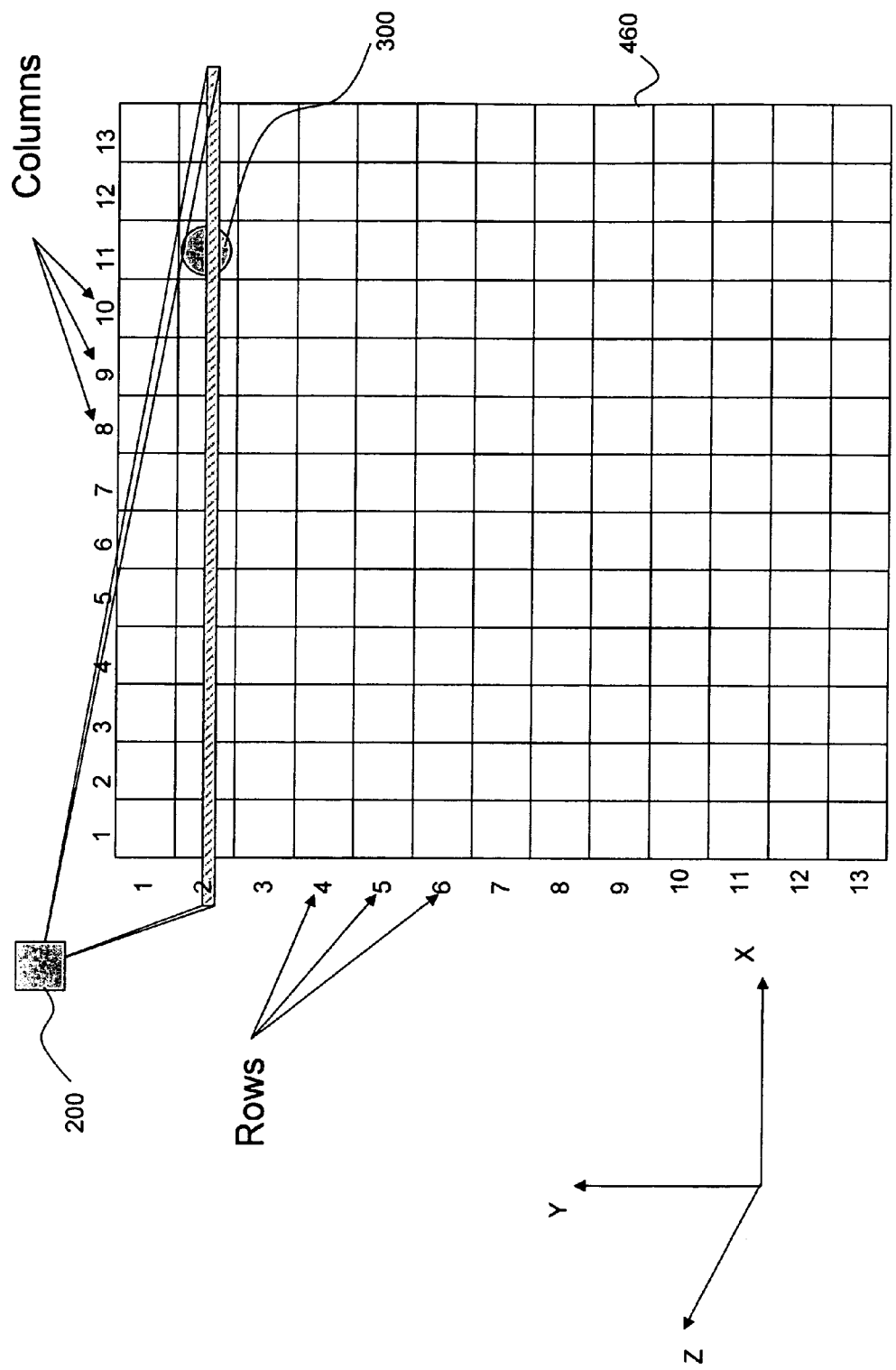
FIGS. 19-20 present a schematic representing a two-pass scan over the virtual grid, with the receiver positioned within the grid.
Figure 20:
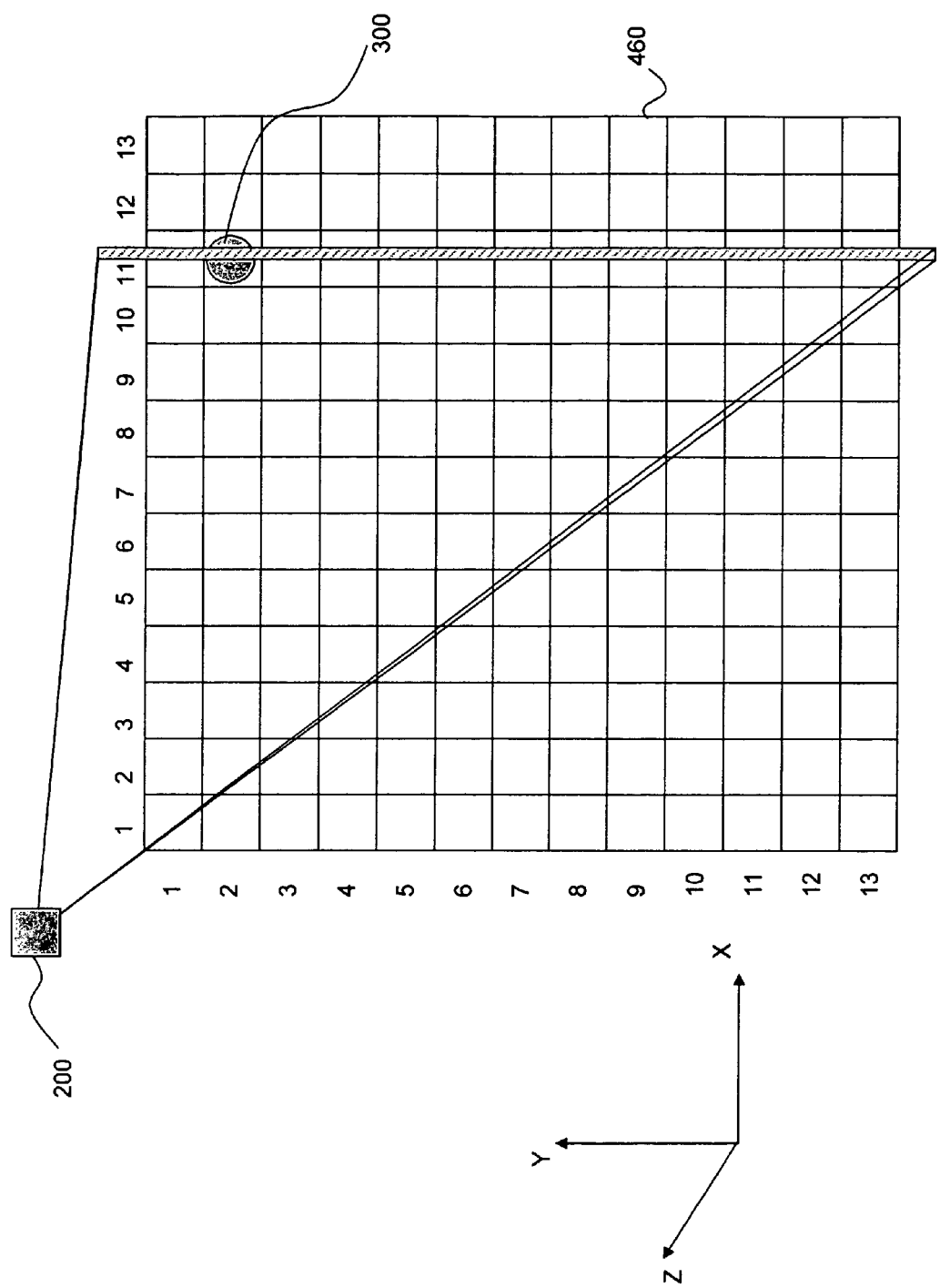

The following is an exemplary scenario in which the drogue assembly 100 determines its position utilizing the first embodiment of the invention. Referring to FIGS. 19 and 20, receiver 300 is located within row 2 and column 11 of the virtual grid 460. Radiation emitter 200 makes a first pass over the scanning area, and thus the positioning area, with the focused optical elongated beam, starting from the top of the scanning area and moving to the bottom of the scanning area, moving the beam from row to row. The discernable property of the beam is changed as the beam moves from row to row. When the beam passes over/through row 2, the receiver 300 detects radiation, and likewise detects the discernable property carried on the optical beam, the receiver 300 outputs a signal indicative of the discernable property of the received radiation to signal processor 500 which determine that the discernable property is indicative of beam location in row 2. The radiation emitter 200 continues to scan the beam over the scanning area. Once it reaches the bottom of the scanning area, the radiation emitter 200 then changes the orientation of the beam such that it is elongated in the vertical direction and scans the scanning area from left to right, moving the beam through each column in the virtual grid 460, changing the discernable property carried on the optical beam as the beam moves from column to column. When the beam passes over column 11, the radiation receiver receives radiation and outputs a signal indicative of the discernable property carried on that received radiation. The signal processor 500 receives the signal and analyzes the signal to determine that the discernable property is indicative of beam location in column 11. The signal processor 500, remembering that the prior signal was indicative of a beam position in row 2, recognizes that the receiver must be in column 11 and row 2 of virtual grid. (Note that in may embodiments of the present invention, the two-pass scan takes place relatively swiftly with respect to the dimensions of the virtual grid such that any movement of the drogue assembly/receiver during that time is negligible.) Because the virtual grid corresponds to sub-areas of the positioning area, by recognizing that the signal processor 500 received a signal indicative of beam location in the distinct sector of row 2 and the distinct sector of column 11, and that these sectors correspond to one another, the signal processor 500 may determine the location of the receiver within the positioning area, and thus determine the position of the receiver relative to the radiation emitter, because the position of the virtual grid relative to the radiation emitter is known.

Figure 21:
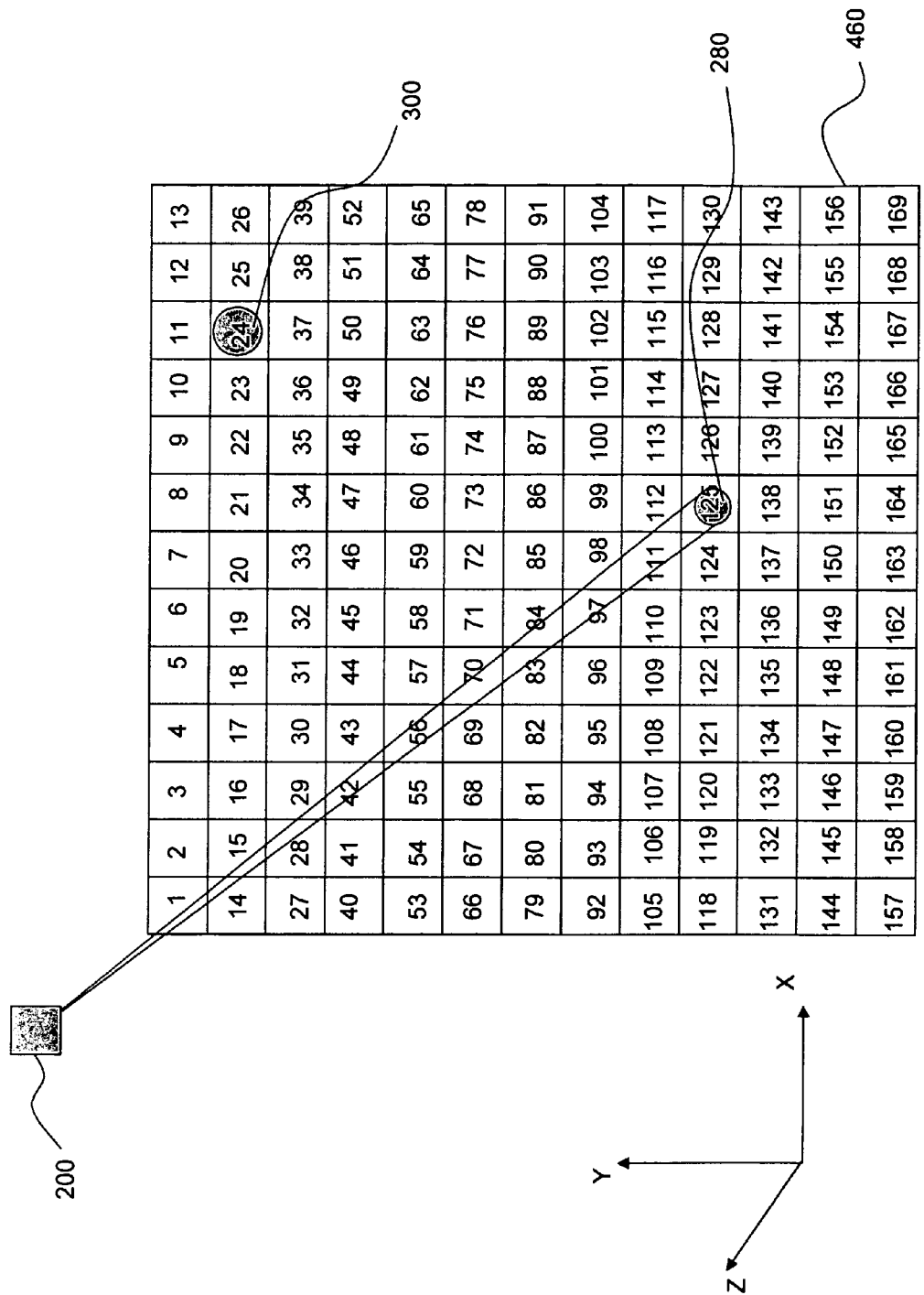
FIG. 21 presents a schematic of another type of scan utilized in the present invention.

FIG. 21 shows implementation of another embodiment of the present invention. Instead of utilizing a focus optical elongated beam in a two-pass/two-scan manner, this embodiment utilizes a traditional non-elongated optical beam, as shown, such that when the beam impinges on the scanning area, the beam forms a circle as opposed to an elongated line. In this embodiment, instead of scanning the beam in a two-pass manner over the scanning area, the radiation emitter 200 scans the beam in an X-Y raster over each of the individual discrete areas of the virtual grid 450. In this embodiment, the discernable property carried on the beam changes in a predetermined manner as the beam moves from each discrete area such that each discernable property is indicative of a specific discrete area within the virtual grid corresponding to a sub-area within the locating area. By way of example only and not by way of limitation, in reference to FIG. 21, the radiation emitter 200 scans the beam 280 across the virtual grid starting at block 1 (discrete sector 1), moving the beam from block 1 to block 2, then to block 3, etc., over to block 13, and then moves the beam to block 14, and then moves the beam to block 15, block 16, etc., repeating this pattern until the beam has scanned over all of the blocks. This scan is then automatically repeated. In the scenario depicted in FIG. 21, when the beam passes over box 24, the receiver 300 will receive the radiation, and thus the discernable property indicative of the beam when directed towards box 24, and then output a signal indicative of the discernable property of received radiation to the signal processor 500. The signal processor 500 then determines that the radiation receiver is located in box 24.

It is noted that in the above description of the X-Y raster, the beam was moved from box 13 at the upper right side of the grid, all the way on the left side of the grid. In another embodiment of the present invention, a raster scan may include, for example, moving the beam from box 13 to box 26, after which the beam is moved to box 25, box 24, etc., all the way to box 14, and then moved to box 27, and then to 28, and then to 29, etc., all the way to 39, and then moved to box 52, and then to 51, etc. Thus, the raster scan includes both the traditional scan performed by a cathode ray tube, as well as non traditional raster scans. Other scanning patterns may be used as well.

It is noted that in the above-described embodiments, the beam scans over the entire scanning area/virtual grid. Other embodiments of the present invention may be implemented where the beam only scans over a portion of the scanning area/virtual grid. By way of example only and not by way of limitation, such may be the case in a system where the signal processor 500 is in communication with the radiation emitter 200 such that after the processor 500 determines a general area within the grid in which the receiver 300 is located, the radiation emitter 200 may concentrate the beam on that general area, as opposed to over the entire area of the scanning area. That is, for example, if the signal processor 500 continues to determine that the receiver is in box 24, or is in the area of box 24, the radiation emitter 200 would not scan the area, say for example, around box 121. However, if the signal processor 500 did not receive a signal indicative of radiation within the area of box 24 for within a certain time period, the signal processor 500 may direct the radiation emitter 200 to again scan over the entire area so as to increase the likelihood that the receiver 300 will receive radiation. This may also be done in the case of the focused optical elongated beam method of scanning as well.

Drogue Assembly Position Control
(Station-Keeping)

An embodiment of the present invention, utilizing the drogue positioning system detailed above, to control the position of a refueling drogue, will now be described by way of an exemplary scenario. As a preliminary matter, it is noted that drogue control may be implemented according to the teachings of U.S. patent application Ser. No. 10/697,564 filed on Oct. 31, 2003, entitled Stabilization of a Drogue Body, the contents of which are incorporated herein in their entirety.

U.S. patent application Ser. No. 10/697,564 claims priority to U.S. Provisional Application Ser. No. 60/498,641 filed on Aug. 29, 2003, the contents of which are also incorporated by reference herein in their entirety, the teachings of which may also be used to control the position of a refueling drogue.

Initially, the drogue 100 is extended from a drogue carrier attached to a wing of an aircraft 1000. The drogue assembly 100 will be extended a sufficient distance from the aircraft 1000 so that aerial refueling may be conducted. This distance, in an exemplary embodiment, is about 100 feet from the wing (and thus the radiation emitter), although in other embodiments, this distance may differ based on the local conditions and/or the type of mission required for the aerial refueling. The refueling drogue assembly 100 will be permitted to obtain a nominal position/effectively constant position (a constant position the location of which will vary with different atmospheric conditions, aircraft speed, etc.) with respect to the aircraft 1000, and thus the radiation emitter 200. At this time, according to this scenario, the aircraft to be refueled is a sufficient distance away from the refueling drogue assembly 100 such that the aircraft to be refueled does not impart any forces onto the drogue that may cause the drogue's position to move.

As noted above, wind gusts, turbulence, the receiver aircraft, etc., may impart forces on the drogue assembly 100 that will make the drogue move from its "effectively constant position." Based on empirical and/or analytical analysis, it is known that, for example, under the given set of circumstances for a particular refueling mission, the position of the drogue/receiver may be maintained within about a 6 inch radius of a nominal location, in some embodiments, within about 2-3 inches, and in others even smaller, such as about 1-2 inches and/or even less than an inch. In some embodiments, the system accounts for turbulence in the frequency range of 1-3 Hz that can cause a few feet of drogue displacement. Moreover, in some embodiments of the invention, the stabilization system may account for bow wave (from the receiving aircraft), which induces translation. Specifically, the system may account for bow wave of steady state that can cause about five feet of displacement and/or 2 to three feet of displacement, depending on such variables as, for example, the control surface size, control surface deflection, control surface actuator force, etc, of the drogue active control system. Some embodiments of the present invention may be implemented to account for forces that cause the drogue to move as much as 10 feet in any direction from a "nominal position" relative to the radiation emitter 200. (For other missions, the drogue could move more or less.) Accordingly, for this particular mission, the area of likely movement of the drogue, i.e., this "10 feet in any direction," will define the scanning area 400 in a first embodiment. That is, the geometry of the scanning area 400 will be set to be 20 feet by 20 feet, centered about the nominal position of the drogue, such that the receiver 300 is very likely to be located within that area during a normal refueling operation. (For other missions, the area may be 10 feet by 10 feet, 10 feet by 20 feet, or more or less, depending on the conditions of the mission. If refueling is being conducted during relatively calm atmospheric conditions, the scanning area would likely be smaller than a scanning area for un-calm conditions.)

It is noted that the location of the scanning area 400 may be adjusted based on the nominal location of the drogue assembly. That is, for example, referring to FIG. 1, for a first type of refueling mission, the nominal location of the drogue may be located, on average, 105 feet in the Z direction, and minus 5 feet in the Y direction, from the radiation emitter 200. In a second type of refueling mission, the drogue may instead nominally be 90 feet from the radiation emitter 200 in the Z direction, and be negative 15 feet in the Y direction from radiation emitter 200.

It is noted that in some embodiments of the invention, the drogue positioning system is configured to adjust the location of the scanning area to conform to the location of the receiver 300. By way of example, the radiation emitter 200 may move the scanning area over a wide area to initially find the nominal location of the drogue, and then refine the scanning area about the drogue. It is noted that in other embodiments of the invention, the drogue positioning system may instead simply start off with a very large scanning area such that the beam may be more dispersed, such as in the instance of use of a focused optical elongated beam, thus covering a greater area. Upon identification of the nominal location of the drogue/receiver, the scanning area may be narrowed accordingly.

In other embodiments of the present invention, the refueling aircraft may include a device that detects the nominal location of the drogue, and uses this detection to direct the scanning area. In other embodiments of the invention, an operator on-board the aircraft 1000 directs the scanning area at the drogue.

It is also noted that in some embodiments of the present invention, it is not necessary that the scanning area be centered on the nominal location of the refueling drogue. Such may be the case in conditions such that it is expected that the drogue will move from the nominal location in some directions more than in other directions.

Once the drogue is nominally located, and the scanning area is directed to this location, the positioning system may begin operating to identify the position of the drogue within the scanning area. Assuming a virtual grid having 13 columns and 13 rows, as is exemplarily depicted in FIG. 14, if the nominal position of the refueling drogue is known, the scanning area/grid will be positioned such that column 7 and row 7 are positioned at the nominal location of the refueling drogue. As discussed above, the radiation emitter 200 may scan over the scanning area, and thus over the virtual grid. The signal processor 500 will determine where the receiver/drogue assembly is located within the grid based on the radiation received by the receiver 300 while the radiation emitter 200 scans the scanning area. In this exemplary scenario, if the signal processor 500 determines that the drogue/receiver 300 is still located at virtual row 7, column 7, the active control system of the drogue assembly will not change its position. However, if, for example, the signal processor 500 determines that the drogue has moved within the virtual grid to row 6, column 7, the signal processor 500 will output a signal to the active control system to move the drogue downward (i.e., in the negative Y direction). The active control system may be commanded to move the drogue downward until the receiver again receives radiation from the signal processor that the drogue/receiver is again located at its nominal position. If, for example, the radiation is indicative of receiver position in row 7, column 7, the signal processor will tell the active control system to stop directing the drogue downward. However, if for example the signal processor determines that the drogue is now at row 8, column 7, this signal processor will output a signal to the active control system to direct the drogue upwards, (i.e., in the positive Y direction). Thus, the drogue positioning system may be utilized in an iterative manner to control drogue location. It is noted that other embodiments of the present invention may operate in different manner. That is, for example, if there is a repeating tendency for the drogue to move from row 7, column 7 to, for example, row 6, column 7, the active control system may adjust a trim on some of the control surfaces of the drogue assembly to direct the drogue back to row 7, column 7, such that this tendency is negated. Basically, the drogue positioning system may be used in any manner that will enable the position of the drogue to be determined such that the position may be adjusted/controlled utilizing an active control system.

It is noted that in some embodiments of the present invention, the distal portion of the refueling hose will be the portion of the drogue assembly that is actively controlled. This is because in some embodiments, the drogue assembly 100 may include a flexible joint, which may be located between the hose 110 and the drogue 105, allowing the drogue 105 to pivot about the centerline of the hose (see, FIG. 3). In such embodiments, it is typically the position of the distal end of the hose that is controlled. In other embodiments, typically, where the hose is rigidly connected to the drogue 105, it is the position of the drogue 105 that is controlled. Accordingly, in some embodiments of the invention, the receiver is rigidly connected either directly to or by way of a rigid interface to the controlled component. If the position of the hose is to be controlled, the receiver will typically be rigidly connected to the hose, as may be seen, for example, by FIG. 3. It is noted that some embodiments of the present invention extend to a retrofit kit including an adapter on which a receiver is mounted that couples a drogue 105 to a hose 110. Depending on which component is to be controlled, the adapter is rigidly connected to that component. In sum, by reference to controlling the location of a refueling drogue assembly, it is meant that at least one point on/in the refueling drogue assembly (drogue, distal portion of the hose, adapter, etc.) is controlled, recognizing that other parts of the drogue assembly may not be controlled.

Specific Features of Some Embodiments

Specific features of the drogue positioning system will now be discussed.

Figure 22:
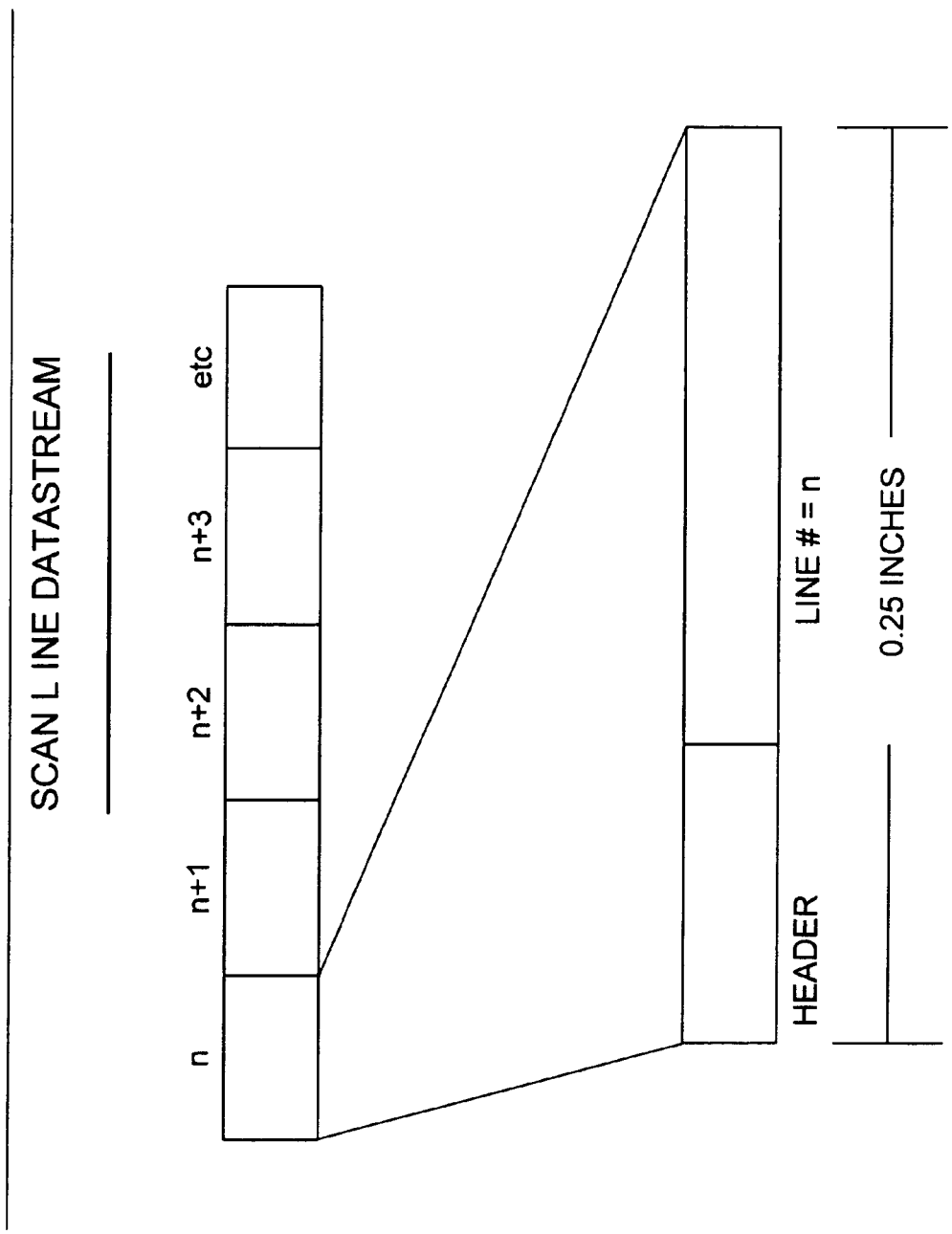
FIG. 22 presents a symbolic representation of a digital data set utilized in an embodiment of the present invention.

As noted above, the radiation emitter 200 may output a focus optical beam. It will be noted that other embodiments of the present invention may utilize other types of radiation. Basically, any type of radiation that may be utilized to determine the drogue location according to the present invention may be used. By way of example only and not by way of limitation, electromagnetic radiation may be utilized. Such an embodiment may utilize technologies associated with VOR and ILS. As noted above, the radiation emitter emits radiation that carries a discernable property that may be received by a receiver and analyzed. This discernable property is used as a reference by the signal processor 200 to determine the location of the receiver/drogue within the virtual grid and the positioning area. This discernable property, in some exemplary embodiments, is created by modulating the beam with digital data blocks that represent the current location of the beam in the scanned area/positioning area. An example of a digital data block may be seen in FIG. 22. FIG. 22 shows a schematic drawing of a modulation of a projected beam. In FIG. 22, a block is exploded. By way of example, only, this block represents a 20-bit data block typical of the other blocks. In this block, the first 8 bits are header information, while the remaining 12 bits represents information regarding the row or column at which the focused beam is directed. FIG. 22 shows that the block is 0.25 inches in length. This corresponds to the width or height of a column or row, respectively, at the tracking area. That is, as the beam scans over the area, the beam is modulated such that modulation sufficient to indicate a column or row is completed as the beam moves 0.25 inches in the area. For example, the first 0.1 inch of movement corresponds to header information, while the last 0.15 inches of movement corresponds to the row/column information. Thus, in this embodiment, the modulation is substantially continuous. (Although in other embodiments, the modulation need not be continuous.) Because in some embodiments the processor 500 is configured to recognize a header, the processor may thus determine that the received radiation is indicative of a new row or column once a new header is received.

In some embodiments of the present invention, modulation is obtained by cycling the intensity of the beam, which in some embodiments corresponds to shutting the beam off (or otherwise blocking the beam) and then turning the beam on (or otherwise directing the beam to the area). Other embodiments may utilize multiple intensities. Embodiments of the present invention may utilize standard digital modulation techniques, such as those utilized in encryption, if those modulation techniques may be coupled to beam location/direction.

It is also noted that the discernable property of the beam may be unique to a given column and row. That is, every column and every row, collectively, may have different discernable properties associated with that column/row. For example, column 2 will be associated with a discernable property that is distinct with all the other discernable properties for all other columns and rows. Such may be accomplished, for example, by utilizing a "smart header:" a header that includes information pertaining to whether the beam is aligned horizontally or vertically, but still allows for the processor to determine that a new block is being transmitted (discussed more below). However, other embodiments of the present invention may utilize the same discernable properties between columns and rows. For example, column 1 may be correlated to a discernable property that is the same as that for row 1, row 2, or row 3, etc. However, in such a situation, based only on the discernable property, without more, the system would not know whether the discernable property is indicative of a column position or a row position. In such instances, for example, the timing between the first and the second pass of the two-pass scan may be adjusted such that every first receipt of radiation is a scan from top to bottom (e.g., a scan indicating row position), and every second receipt of radiation is a scan from left to right (e.g., a scan indicating column position), or in any other pre-determined pattern. Such may be determined, by way of example, by pausing in-between each scan for a certain amount of time. For example, a scan from top to bottom might be separated by a predetermined time period from the following scan from left to right. The scan from left to right may in turn be separated by different predetermined time period. The signal processor 500 may be programmed to look for different time periods between receipt of outputted signals from the receiver and, from a look-up table, recognize the type of scan. Alternatively, the beam may carry two or more discernable properties at the same time. For example, one property may be indicative of the type of scan (either top/down or left/right) and the other may be indicative of the location within the scan area, i.e., what column/row).

By way of additional example, in the case of utilizing a non-elongated (normal beam) such is shown in FIG. 21, one discernable property may be adjusted to indicate the beam's location within a column, while the other discernable property may be adjusted to indicate the beam's location within a row such may be used for two-pass scans as well. In summary, any type of modulation/change in discernable property of radiation that may be utilized to correlate beam location within the virtual grid with respect to the radiation emitter may be utilized to practice the present invention.

Figure 23:
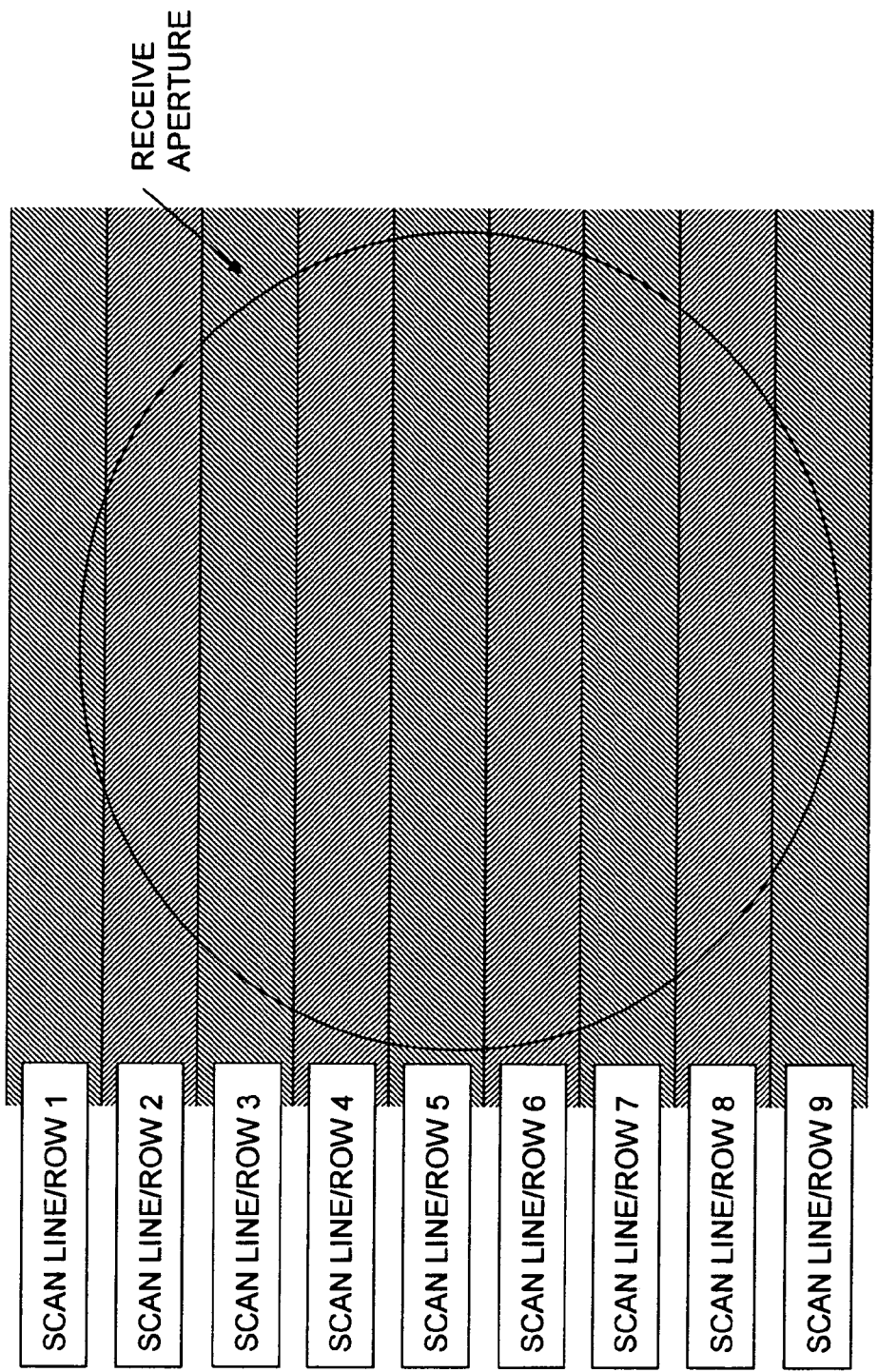
FIG. 23 presents a schematic representing row orientation with respect to receiver aperture for a small beam/large aperture configuration.

It is noted that beam receiver overlap may be utilized to practice the present invention. That is, by way of example, some embodiments of the present invention may utilize a ratio of 6 to 1 for beam/receiver overlap, although other embodiments may utilize a larger or smaller ratio. Overlap may be obtained by utilizing either a big beam/small receiver, or a small beam/big receiver. FIG. 23 shows an exemplary scenario utilizing an embodiment utilizing a big receiver/small beam. In FIG. 23, the rows (and although not shown, the columns) of the virtual grid are such that multiple rows (and columns) fit within the receiver aperture when virtually overlaid with the receiver aperture. In the embodiment shown in FIG. 23, 7 rows fully fit within the receiver aperture, although again, more or less rows may be utilized in other embodiments. In an embodiment according to FIG. 23, the discernable property may change at least seven times as the beam moves through each of the rows, and thus the receiver may output seven signals, each of which indicate a specific discernable signal. This will be, of course, the case for the columns of the grid as well, providing that the columns are dimensioned similar to the rows of the grid. In this regard, column size and row size may be directly correlated to the ability to control the beam and to vary the discernable property of the beam.

In a first embodiment of the present invention, it is expected that the columns and rows of the virtual grid will be 0.25 inches in height/width when the scan area is about 100 feet from the radiation emitter and about 10 feet below the radiation emitter. Thus, the discernable property of the beam may change as the beam moves 0.25 inches in the sweeping direction. Of course, other embodiments of the present invention may use a larger or smaller row/column height/width. By way of example, some embodiments may utilize heights/widths of 0.1 inches or less and/or 1.0 inches or more. In many embodiments of the present invention, the discernable property of the beam will change as it moves from one column to the other. Thus, the discernable property may change less frequently for grids utilizing rows and columns that are larger. According to some embodiments of the invention, the scan area will be a 120 inch×120 inch square, at 100 feet from the radiation receiver, and the row/column height/width will be 0.25 inches. Thus, the scan area will be made up of 480×480 columns and rows (scan lines). However, it will be noted that other embodiments of the present invention may use different sized/shaped scan areas. By way of example only, and not by way of limitation, a circular scan area may be used where the beam is scanned in a helical pattern, starting from the center and moving outward. In such an embodiment, again, it may be possible to have an interactive system such that the scan begins at the center, where receiver is most likely to be located, and then scans outward, and once the radiation receiver receives the radiation, the radiation emitter may be controlled to reset the scan again, starting at the center and/or at the approximate location of the drogue. Other embodiments may utilize a rectangular section or any other shaped section that will achieve the results of drogue positioning, according to the present invention.

In the example of FIG. 23, where the height of each row represents 0.25 inches, the receiver will receive fully seven different discernable properties carried on the received radiation, and output seven different signals to the radiation receiver, (or alternatively, output a single signal carrying a data package which is indicative of the seven indicative properties received by the received radiation). In other embodiments, the receiver simply outputs signals indicative of all information received, and lets the signal processor 500 determine whether a full data set has been received. The signal processor 500 will analyze the signal(s) and determine that radiation has been received that is indicative of seven different rows within the grid, and thus the exact position within the virtual grid may not necessarily be known. In some embodiments, the receiver and/or signal processor determine whether a full data set has been received base on the number of bits received between receipt of headers. For example, in the scenario depicted in FIG. 23, the receiver will not receive a header until row 2, and thus will know to ignore the information preceding. Also, after receiving the header of row 9, the receiver will not receive another header, and also will not receive a full 20 bits of information before the radiation stops, and thus will know to ignore any information following the last receipt of 20 bits. In such a scenario, the receiver and/or signal process such that the seven different rows are averaged in a manner such that the average row location would be determined. For example, in the figure of FIG. 23, the average row will be row 5. If, for example, the receiver aperture was moved downward 1 row such that the average row was row 6, the signal processor could output a signal to the active controller to adjust the control to move the drogue upward, such that the average of the received rows would again be row 5. Still further, referring to FIG. 23, it may be seen that radiation from row 1 and radiation from row 9 would also be received by the receiver, if only in a fractional amount. According to an embodiment of the invention, this partial received radiation may correspond to only a receipt of a partial data set, and the receiver may be of a design such that the receiver will not output a signal upon receipt of only a partial data set/partial amount of radiation. That is, with reference to FIG. 23, the receiver would only out put seven signals, not nine signals (i.e., the receiver would basically ignore the radiation of column 1 and column 9. However, other embodiments of the present invention may output a signal upon even receipt of a partial data set.

In another embodiment of the invention, the number of bits received during a pass is used to obtain a hyper accurate position within a sector/sub-area. Referring to FIG. 23, the processor 500 know the number of bits that it received, and know that it received a full data set for lines 2 through lines 8. For example, the processor 500 will know that it received 7×20 bits for rows 2 through 8, that it received, for example, 5 bits before it received a full 20 bits representing row 2, and that it received 10 bits after it received a full 20 bits representing row 8. The processor can thus determine that the center of the receiver is located closer to row 9 than row 1. In fact, the processor can determine that the center of the receiver is about 12.5 bits away from the top of row 5 (e.g., 155 bits received, divided by 2, minus the 5 bits received from line 1=72.5 bits below the top of line 2, and if each line represents 20 bits, the center will be 12.5 bits away from the top of row 5—the distance from the bottom of row 5 may be determined as well, both to verify the correctness of the calculation, or to smooth possible rounding errors.) Thus, instead of simply being able to determine that the receiver is centered within row 5, a determination may be made that the receiver is centered 0.15625 inches below the top of row 5 (12.5 bits divided by 20 bits times 0.25 inches). Other algebraic manipulations may be utilized as well to practice this embodiment of the invention to obtain hyper accurate results.

A processing algorithm that may be used in the present invention is as follows. Assuming that the raster is numbered top down and that the message packets are numbered left to right, the center raster scan line is:

A. Lowest_number_scan_line_detected+((Highest_number_scan_line_detected−Lowest_number_scan_line_detected)/2).

B. The center packet is: For the scan line from "A," above, lowest_packet number+((highest_packet_number−lowest_packet_number)/2).

As noted above, embodiments of the present invention may either utilize big beam/small receiver or a small beam/big receiver. Any size beam and any size receiver may be utilized providing that drogue positioning may be obtained according to the present invention.

Figure 24:
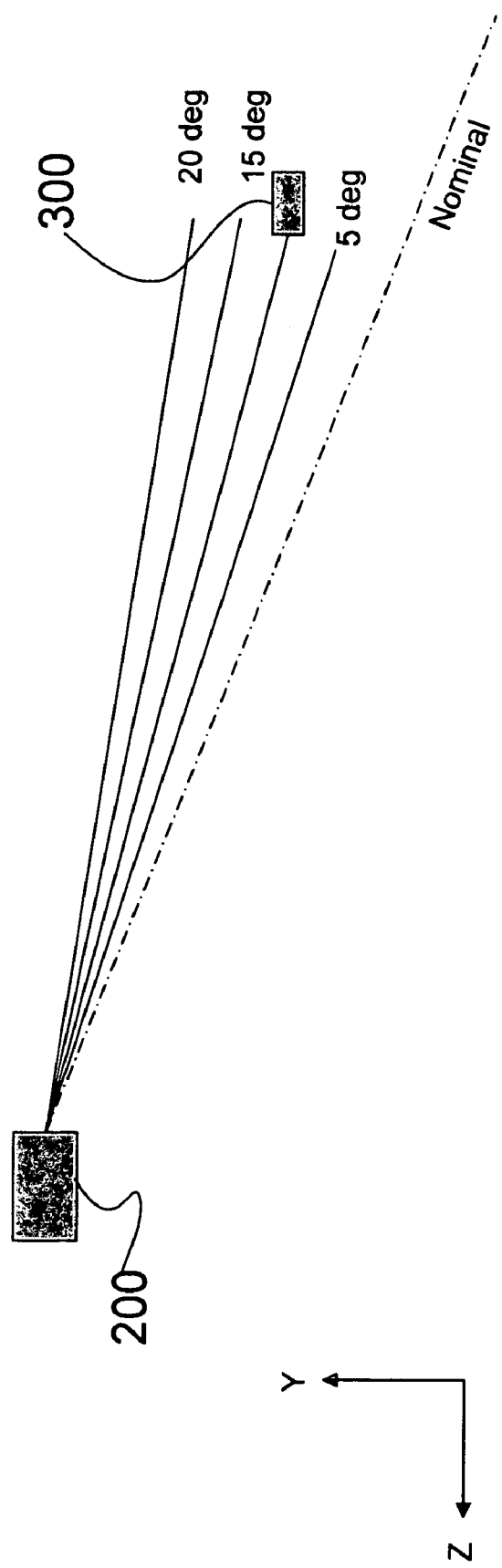
FIGS. 24 and 25 schematically represent drogue positioning without the use of a virtual grid.
Figure 25:
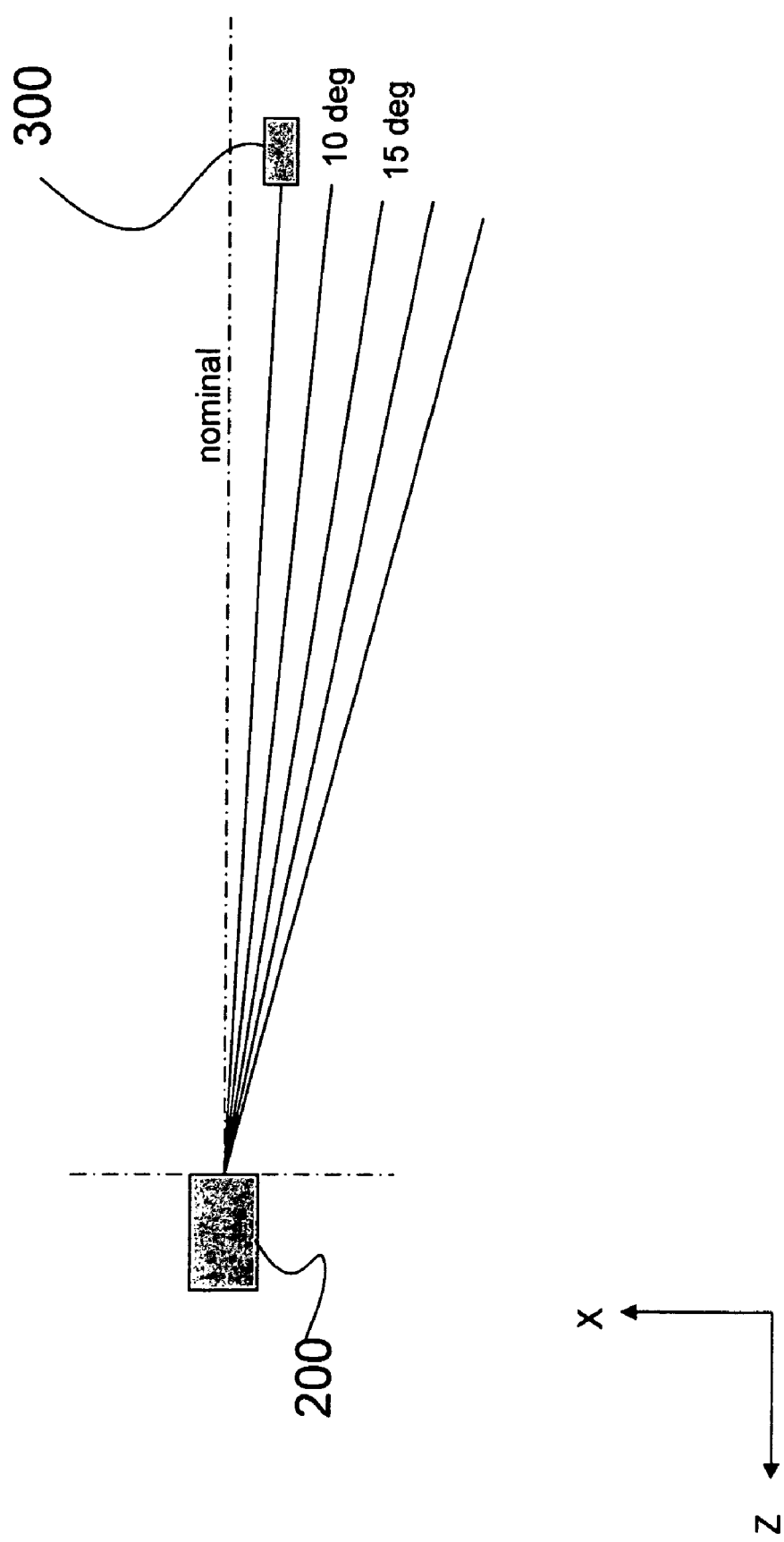
Figure 26:
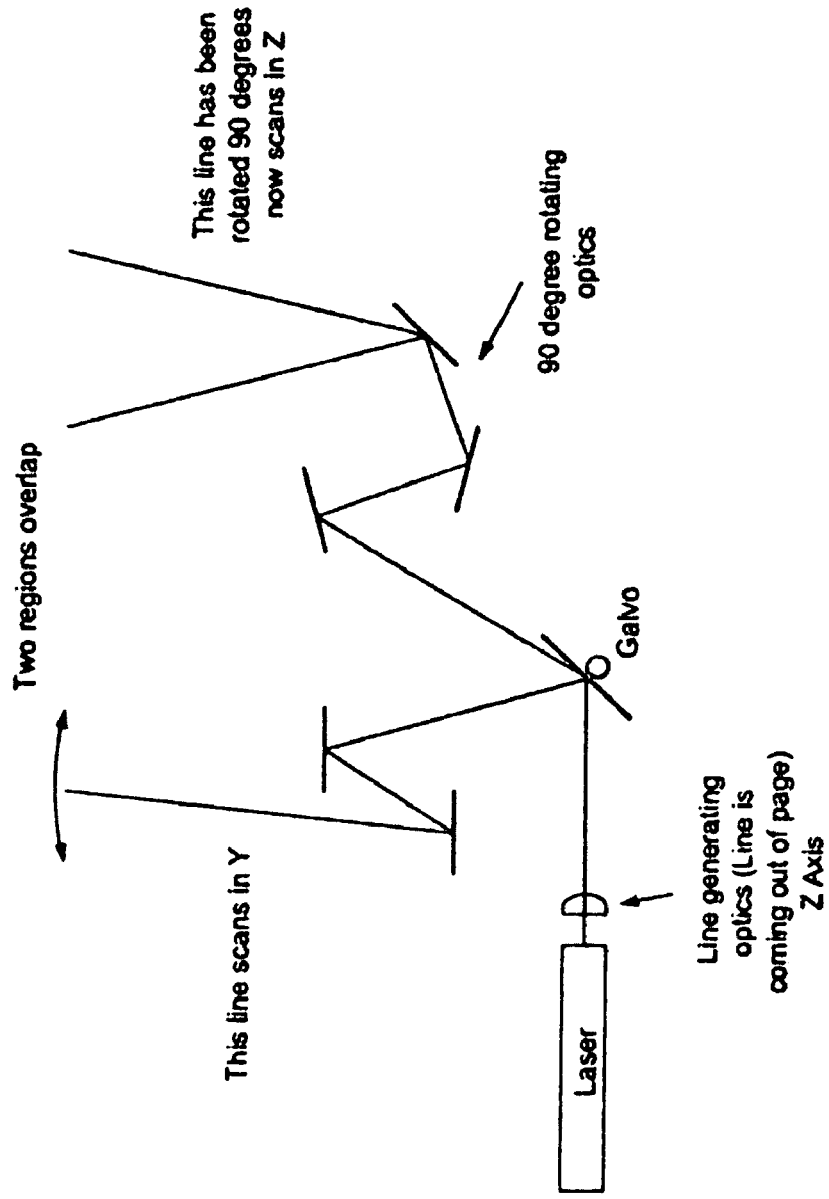
FIGS. 26 to 31 schematically represent various galvo designs.
Figure 27:
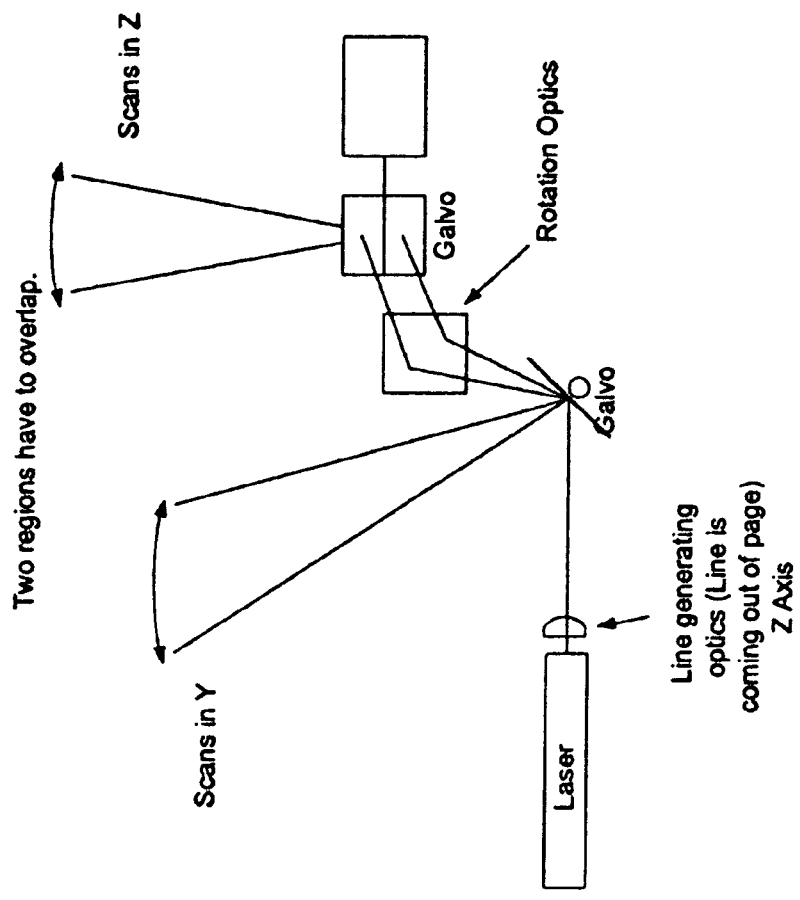
Figure 28:
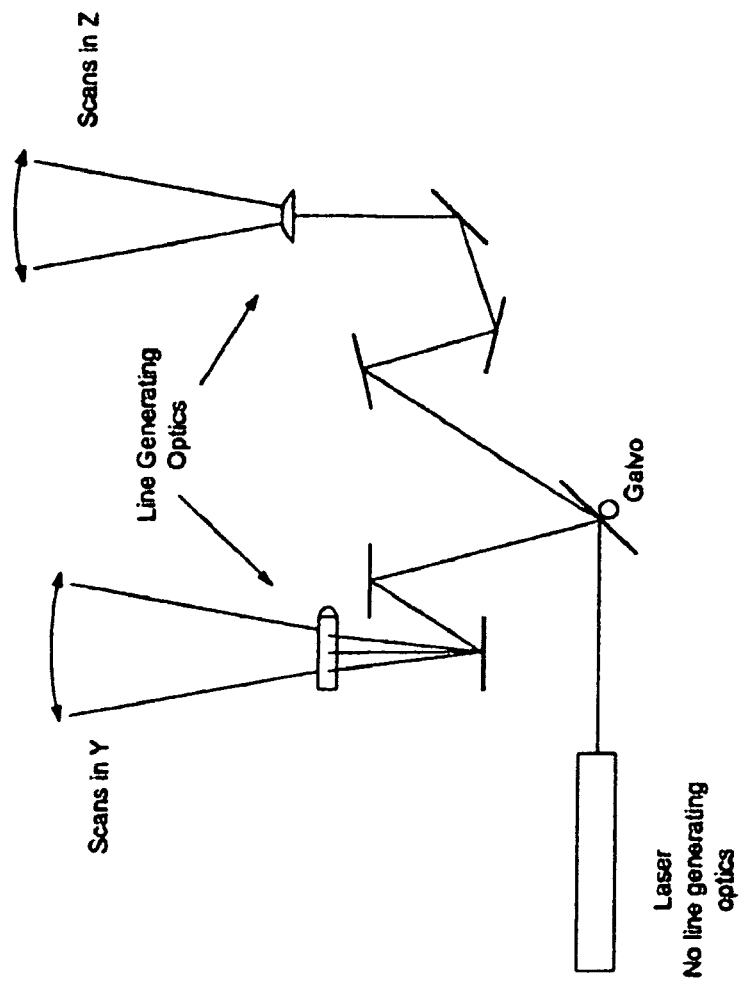
Figure 29:
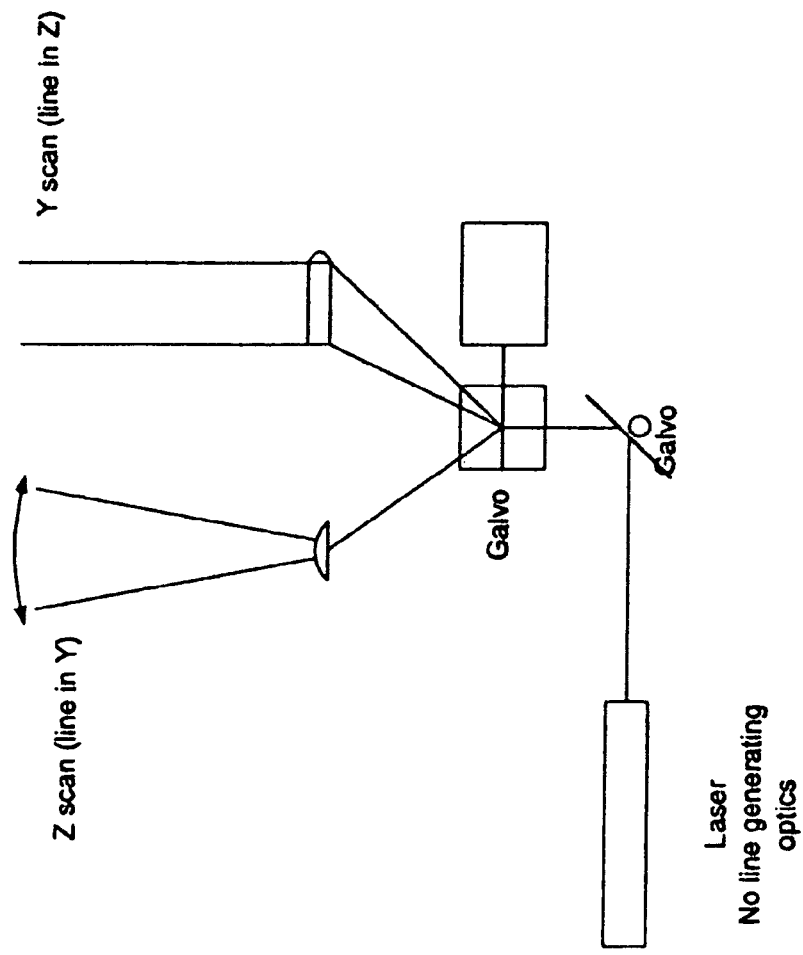
Figure 30:
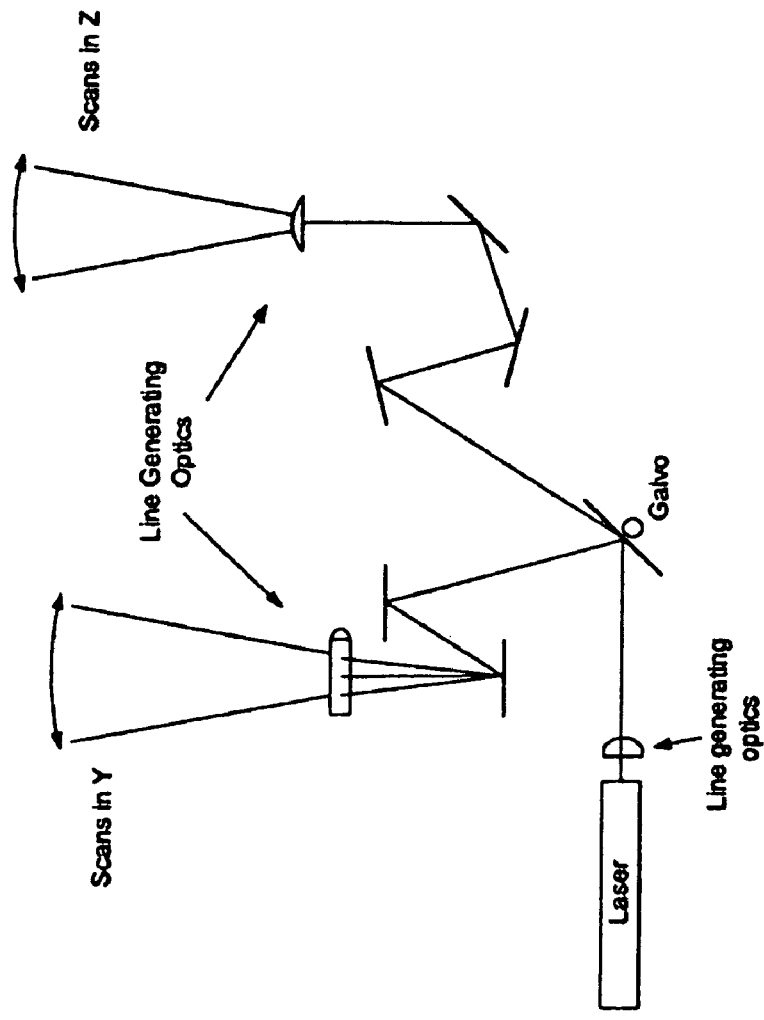
Figure 31:
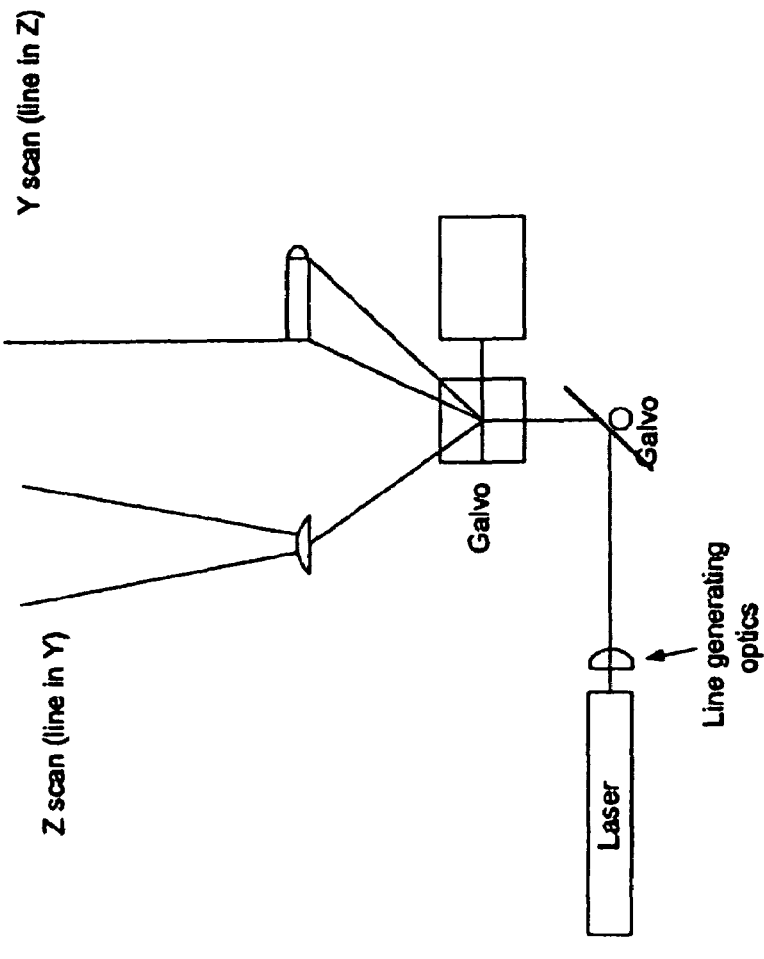

Many of the embodiments, according to the present invention utilize the virtual grid as detailed above. However, other embodiments of the present invention may be practiced without utilizing a virtual grid. By way of example, a focused optical non-elongated beam, such as that according to FIG. 21, may be scanned such that the beam contains discernable properties that are indicative of the angular orientation of the beam with respect to the radiation emitter. In such a situation, two reference planes may be created, which may be, but do not necessarily have to be orthogonal to one another. For example, FIGS. 24 and 25 show angular orientation from planes extending out of the view passing through the nominal angle of beam direction as may be seen. According to FIG. 24, the receiver is located at plus 10 degrees above the plane passing through the nominal angle. According to FIG. 25, the receiver is located at plus 5 degrees to the side of the plane passing through the nominal angle. If the nominal "location" of the beam is plus 10 degrees and 0 degrees, the active control system may be directed to steer the drogue back 5 degrees. In such an embodiment, both the elongated beam and the non-elongated beam method of scanning may be used. If the non-elongated beam method is used, the beam zone, the beam zone may include a plurality of distributed distinct vector of known orientation with the radiation emitter such that if the signal processor determines which distinct vector a received beam coincides with, the orientation of the receiver relative to the radiation emitter may thus be determined. That is, the distinct vectors correspond to actual orientations of the beam with respect to the radiation emitter, the actual orientations being disbursed within the beam zone in a geometrically defined manner.

In such an embodiment, the radiation emitter is adapted to direct a beam of emitted radiation to an area away from the radiation emitter, the radiation including discernable properties that vary in a corresponding manner with varying orientation of the beam of radiation with respect to the radiation emitter. By way of example, the radiation emitter is adapted to emit a focused optical beam modulated with digital data blocks, the modulated digital data blocks respectively indicative of discrete orientations respectively corresponding to orientations of the beam relative to the radiation emitter. Some of the varied discernable properties are respectively indicative of discrete orientations respectively corresponding to orientations of the beam relative to the radiation emitter in a first reference frame, and wherein at least some of the varied discernable properties are respectively indicative of discrete orientations respectively corresponding to orientations of the beam relative to the radiation emitter in a second reference frame.

Based on the output of the receiver, the processor is adapted to process the outputted signal and identify a first virtual orientation indicative of an orientation of the receiver relative to the radiation emitter when at least a portion of the radiation was received by the receiver. By way of example, the signal processor is adapted to analyze a first outputted signal from the receiver that is indicative of a first discernable property of the received radiation indicative of a first discrete orientation corresponding to a first orientation of the beam relative to the radiation emitter in the first reference frame at the time that the radiation was received. Still further by way of example, the signal processor is adapted to analyze a second outputted signal from the receiver, the second outputted signal being indicative of a second discernable property of the received radiation indicative of a second discrete orientation corresponding to a second orientation of the beam relative to the radiation emitter in the second reference frame at the time that the radiation was received. Accordingly, the signal processor is adapted to identify a virtual location of the receiver relative to the radiation emitter based on the analysis of the first and second outputted signals.

As discussed above, some embodiments of the present invention are configured to permit the drogue assembly 100 to maintain a position relative to the radiation emitter. Such maintenance may be performed in some embodiments without the need for communication between the radiation emitter and the drogue assembly 100. For example, the signal processor 500 on the drogue assembly 100 may be furnished with look-up tables sufficient to analyze the signals from the receiver and identify the current location of the refueling drogue within the positioning area/virtual grid. However, in other embodiments, the drogue may be in communication with the refueling aircraft.

An embodiment of the prevent invention include kits that comprise devices that will enable conventional refueling drogue to be retrofitted for positioning determination and/or to be actively controlled. (Such embodiments also extend to methods of conversion as well.) Such devices might come in the form of a pack that includes a receiver, a signal processor, and/or control surfaces, sensors, etc., necessary to implement positioning determination and/or active control. In some embodiments of the present invention, a pack may have the positioning system and the active control system in one pack, or at least the components that physically interface with the air stream (e.g., the vanes, the control surfaces, etc.) required to implement those systems (the other components may be added directly to the refueling aircraft as long as there is a means to interface with the retrofit packs). Thus, any kit/pack that contains any or all of the above elements of the drogue positioning system and/or the active control system and/or will permit the implementation of the functions of position determination and/or active control on an existing refueling drogue, may be utilized to practice some embodiments of the invention It is further noted that the present invention includes software, firmware and/or computers (including simple logic and/or error circuits) adapted to implement the above techniques. Also, while some embodiments of the present invention may be practiced manually, other embodiments may be practiced automatically. Thus, the present invention includes any device or system that may be configured or otherwise used to implement the present invention in an automated manner.

Some embodiments of the present invention may be configured to generate electricity at the refueling drogue 100, to power the receiver, the signal processor and/or the active control system, etc.

As discussed above, the scanning area is treated as being an area that is flat. However, under such treatment, the distance of the scanning area to the radiation emitter will be larger at the edges of the scanning area than at the center of the scanning area (assuming a scanning area centered about the nominal direction of the emitted beam), owing to the change in angle of the beam between the center and the edges of the area. Thus, the distinct sectors of the virtual grid/sub-areas may differ in size between those at the center of the grid/locating area and those at the edges to account for this phenomenon. Indeed, in some embodiments of the invention, the grids are defined by the optical beam. That is, how the beam changes controls the size and shape of the virtual grid/the sub areas. In this respect, the grid is more of a convenient way to express location of the drogue. If the present invention is practiced to maintain a position of the drogue, uniformity of the virtual grid is not needed. In fact, the grid could be dispensed with entirely, providing that logic is utilized to control the position of the drogue. (For example, large look-up tables may be utilized and/or modified fly-by-wire logic may be used corresponding to the various discernable properties as they correspond to orientation of the beam with the radiation emitter. For example, exhaustive if-then routines might be utilized.) Alternatively, the angular change of the orientation of the emitted beam may be varied to utilize a consistently sized grid (i.e., larger angular changes while scanning at the edges of the grid/tracking area than while scanning near the center of the grid. Also, a combination of the two may be utilized.

In this regard, the tracking area/virtual grid may be treated as a curved surface instead of a flat area. In this regard, it is noted that when the refueling drogue assembly 100 moves relative to the radiation emitter, it is likely that the assembly 100 will move in three dimensions. That is, assuming that the refueling hose 110 is of a constant length during refueling, a change in position in the "X" or "Y" direction (referring to FIGS. 1 and 2) will result in a change in position in the "Z" direction. Thus, embodiments of the present invention may be implemented that account for the position of the drogue in three dimensions (i.e., a positioning volume may be utilized to determine the position of the drogue). Such may be accomplished by adding, for example, a second radiation emitter or a second radiation receiver a know distance from the first radiation emitter or the first radiation receiver, respectively, and triangulating between the two. Alternatively or in addition to this, some embodiments of the present invention might utilize two or more receivers spaced about the drogue assembly that analyze which beam was received by which receiver during a given pass. For example, if at a distance of 100 feet from the radiation emitter, for a given location within the receiving area, receiver A is expected to receive radiation carrying a property indicative of receiver position at column 45 and receiver B is expected to receive radiation carrying a property indicative of receiver position at column 57, and if at a distance of 102 feet from the radiation emitter, again for the "same" location within the receiving area receiver A is expected to receive radiation carrying a property indicative of receiver position at column 44 and receiver B is expected to receive radiation carrying a property indicative of receiver position at column 58, the distance in the "Z" location may be obtained based on this phenomenon, as applicable.

According to the above, embodiments of the present invention may be implemented utilizing positioning areas and/or positioning volumes in a manner that will permit drogue positioning/station keeping to be implemented according to the present invention. In summary, any coordinate system may be utilized to practice the present invention.

Scaled Test Model

U.S. Provisional Patent Application Ser. No. 60/656,084, entitled Optical Tracking System for Refueling, filed on Feb. 25, 2005, the contents of which are incorporated herein by reference in its entirety, discloses, among other things, embodiments of the present invention configured for wind-tunnel scaled testing of at least some of the methods, devices, and systems as described herein. It is noted that the present invention thus includes the devices, systems and methods disclosed therein, scaled or unscaled. The present invention thus further includes the devices, systems and methods disclosed therein scaled for implementation with the teachings herein.

According to some embodiments of the scaled test model, the optical link is be visible and eye safe; the distance to the target may be about 10 feet, the active area of the scan beam (scanning area) may be about 12.8 inches by about 12.8 inches at the receiver; the grid resolution at the target may be about 0.025"; the beam spot size at the target may be about 0.015" diameter or less; the frame rate may be about 100 Hz; the receiver active area may be about 0.250" diameter or more; and the receiver may have a field of view of 30° (i.e. a conic included angle of 30°). Still further, according to some embodiments of the scaled test model, there may be 512×512 scan lines in a frame; there may be 18 bits minimum of encoding information on the beam for each position on the target grid such that (assuming 18 bits) a 26.2144 MHz data rate will be achieved, i.e., 512×512×100=26.2144 MHz data rate; encoding on the beam may be of a form that permits quick recognition that only a partial data frame has been received; sync and/or framing bits may be permitted, while recognizing that the data rate increases proportionally with the additional bits; and a single complete block of position data may take 0.78 μs. Such features may be scaled for implementation in a system as described herein for aerial refueling. By way of example, in some embodiments, it is expected that a frame (e.g., an complete horizontal and vertical scan) may be completed with a speed such that 20 frames/second may be accomplished. That is, one frame may be accomplished in 50 milliseconds. By way of example, a horizontal scan might take 20 milliseconds, and a vertical scan might take 20 milliseconds. If there were 500 rows/columns per scan, at 20 bits per row/column, 10,000 bits of information would be conveyed in 20 milliseconds.

The output of the receiver function may be an RS-232 data stream containing 3 bytes of data and running at 115.2 Kilo Baud. This data may be only the 18 bit position information without any sync or header bits. This message may be the code for the frame that is nearest the center of the receiver. This may be determined by analyzing all complete frames within the field of view of the receiver. This message stream may repeat at 100 Hz. Synchronization of the 3 byte frame may be either relative to the start of a complete scan frame or relative to the receiver processing element.

The transmitter may be self contained and may require only power applied to function. All beam forming, scanning, and modulation elements may be supplied. The transmitter may optionally be in two parts: an optical head; and an electronics assembly. Separation of up to 8 inches may be present between the optical head and the electronics if the transmitter is a two part unit.

The mounting on the receiver may have dynamic motion up to a frequency of 10 Hz; this motion may include both translation and rotation. Assuming an edge to edge motion over the 12.8 inch range at 10 Hz, the receiver will move 10 inches per 0.1 s. (i.e., at a rate of 100 inches per 1.0 s=0.0001 inches per 1.0 μs).

Although ambient light directed into the receiver may not be eliminated, it can be reduced or be made to be indirect. Moreover, although the receiver may be bandwidth limited by the use of optical filters, the operating wavelength may be in the visible band and, therefore, ambient light may still be present.

An exemplary implementation of an embodiment of the invention suitable for wind tunnel testing is as follows, and may be scaled accordingly for actual implementation.

Figure 32:
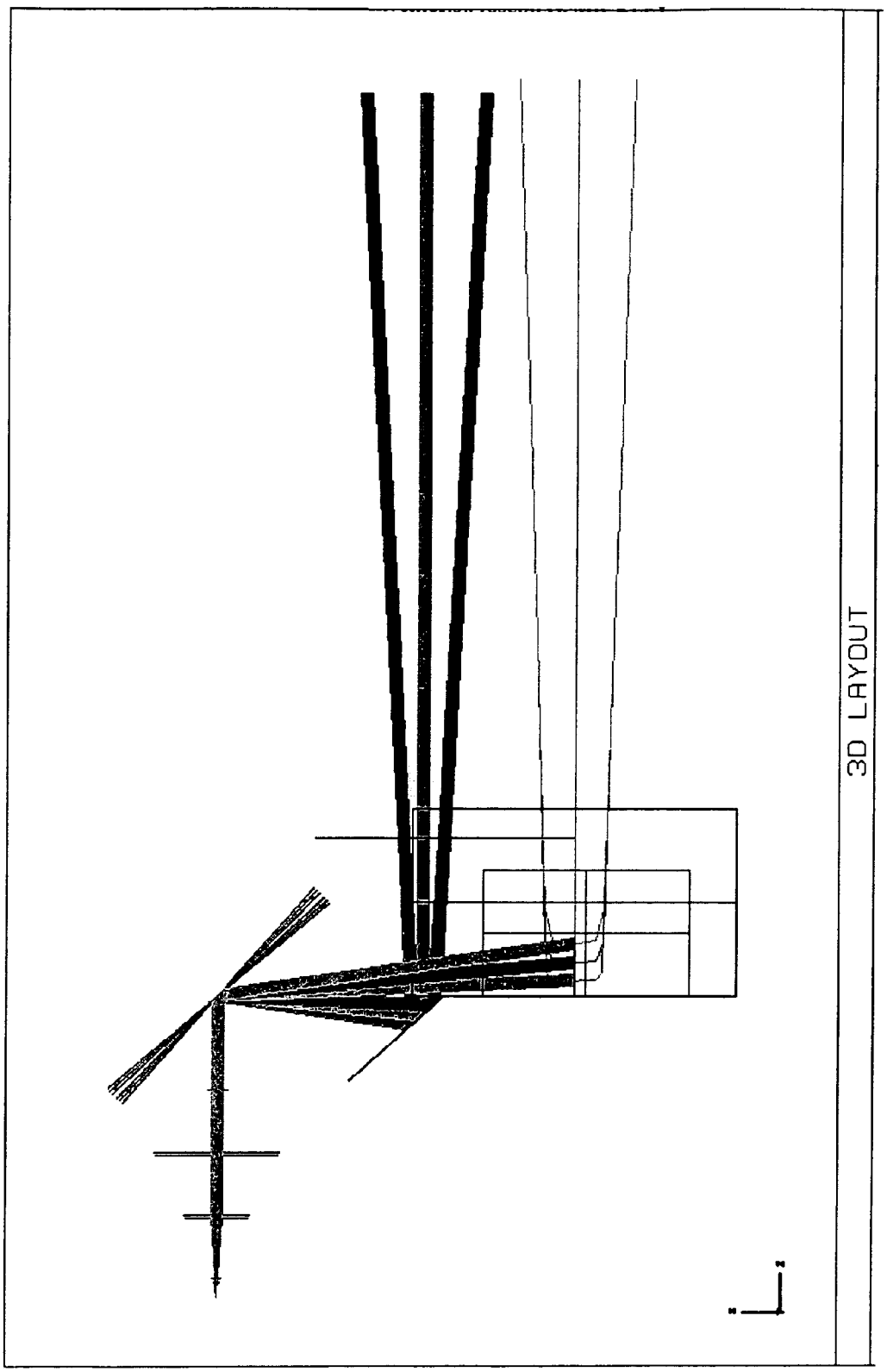
FIGS. 32 to 33*b* schematically represent beam emission in elapsed time.
Figure 33A:
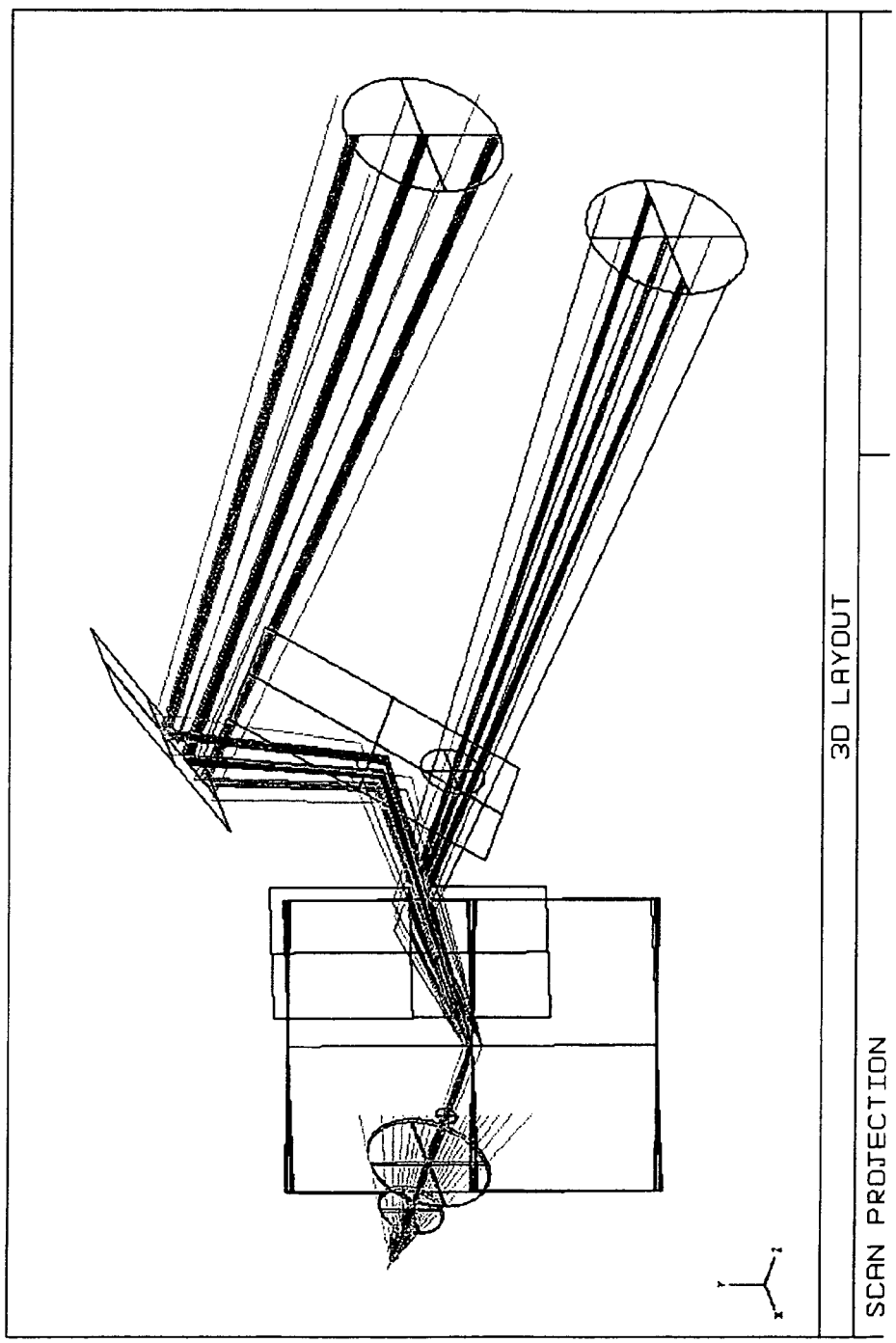
Figure 33B:
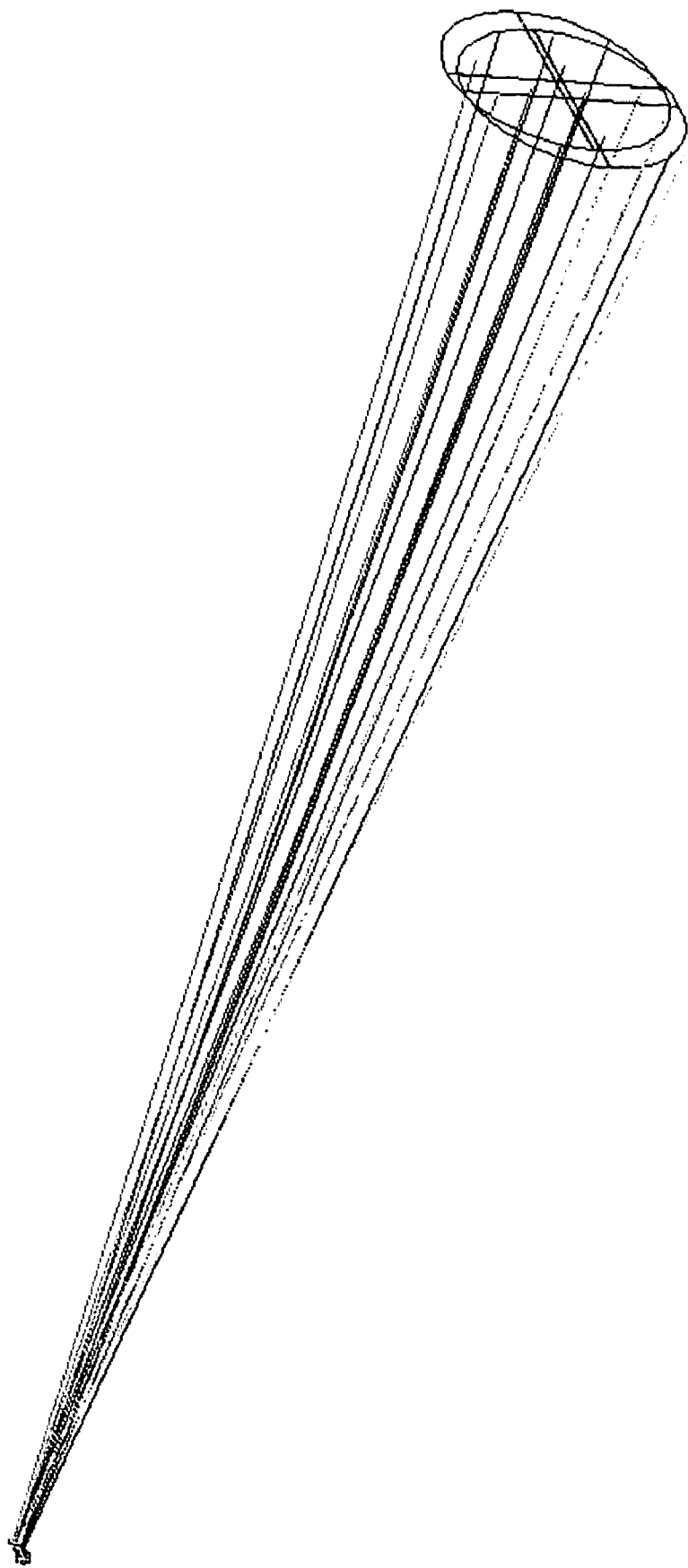
Figure 34:
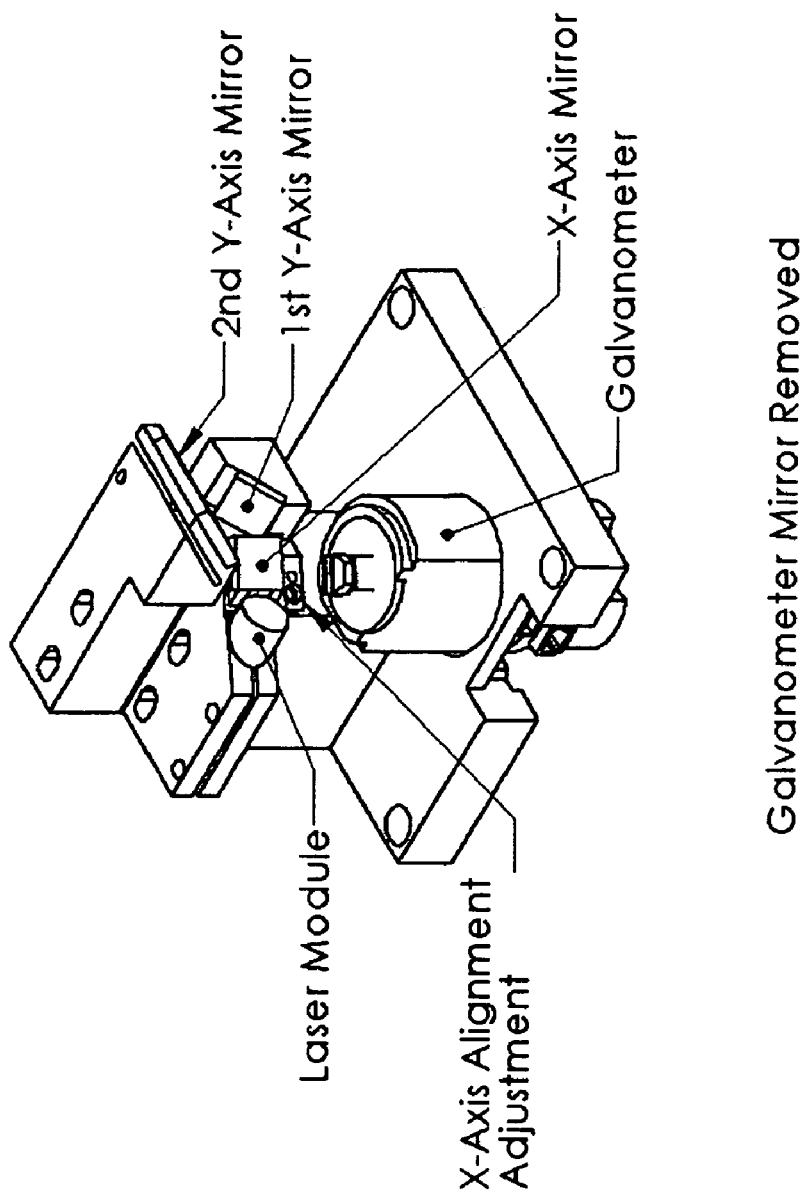
FIGS. 34-40 schematically represent an emitter according to an embodiment of the present invention.
Figure 35:
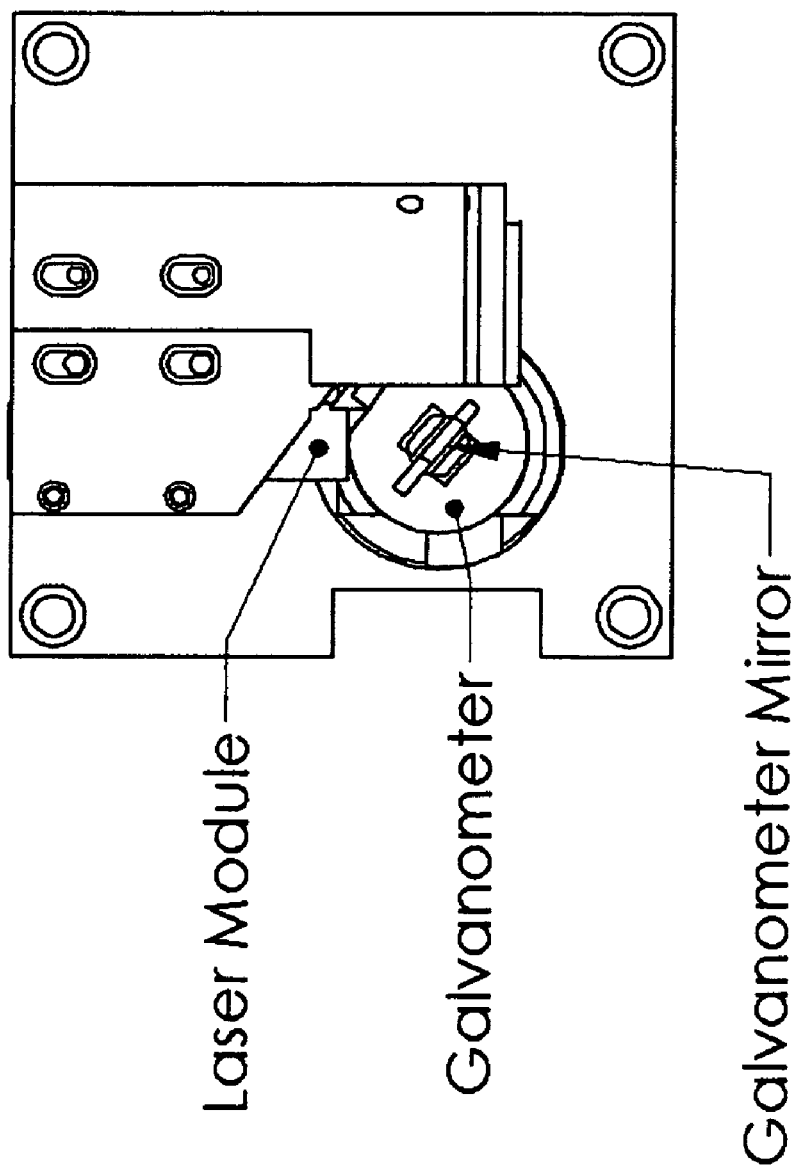
Figure 36:
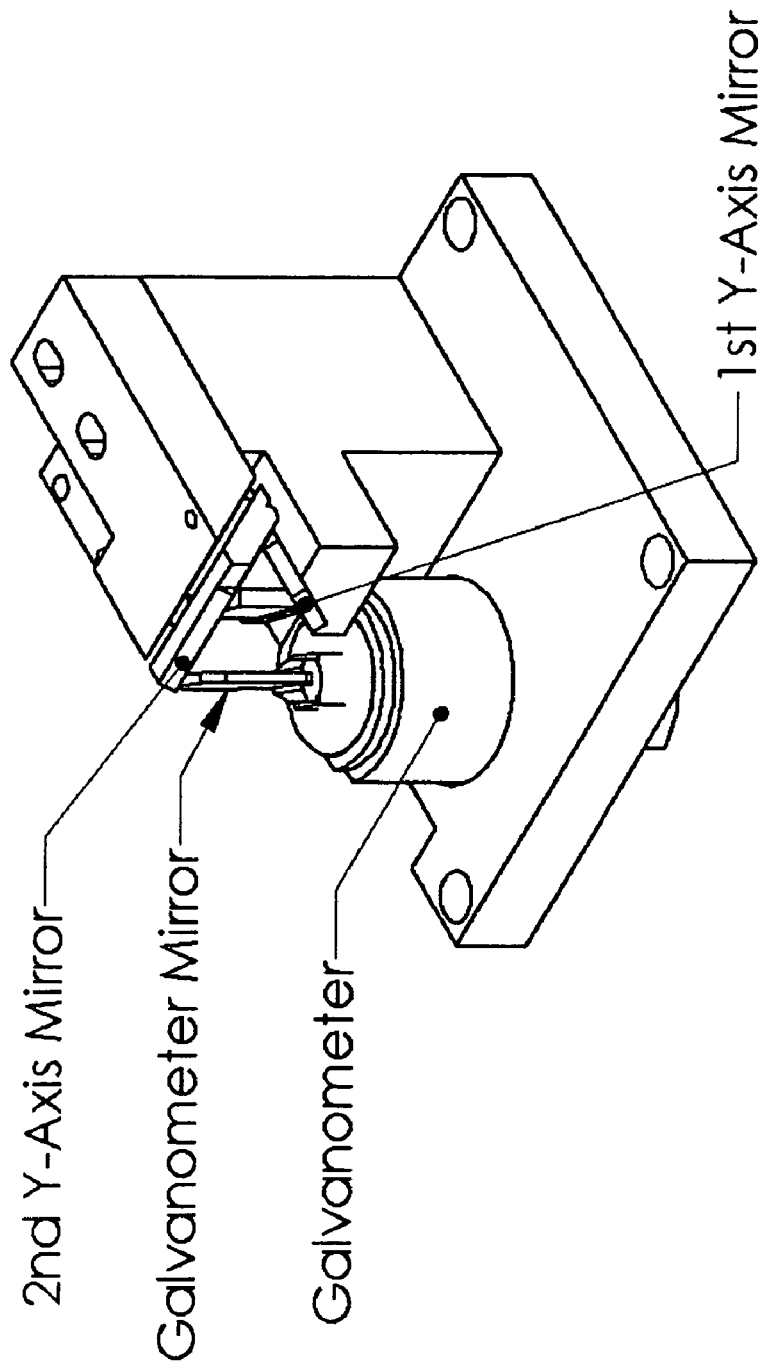
Figure 37:
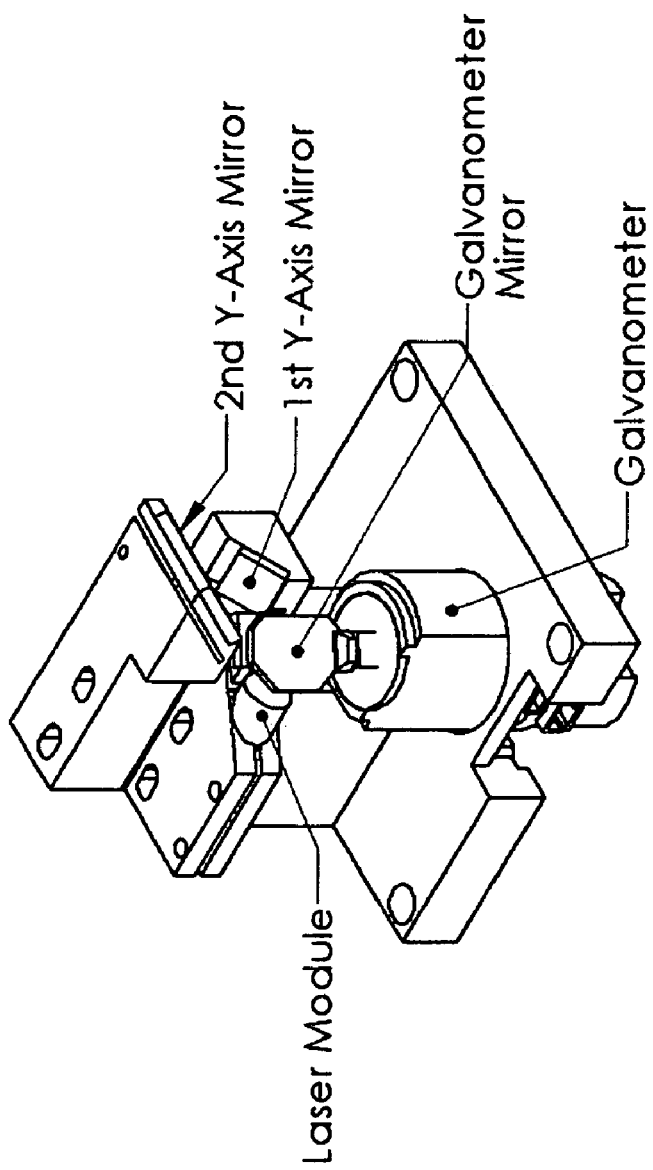
Figure 38:
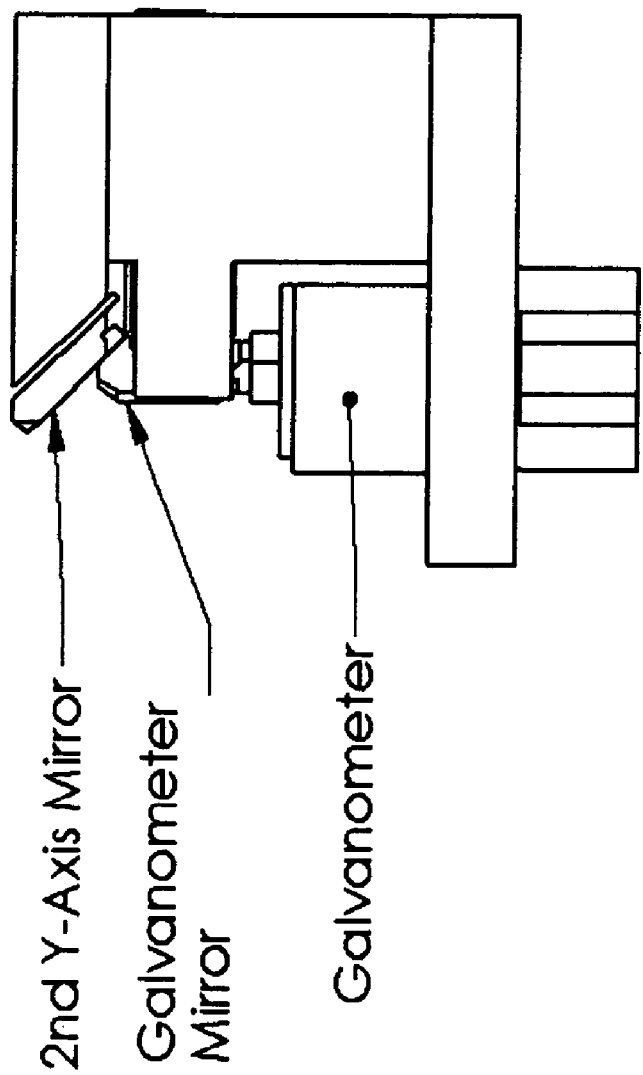
Figure 39:
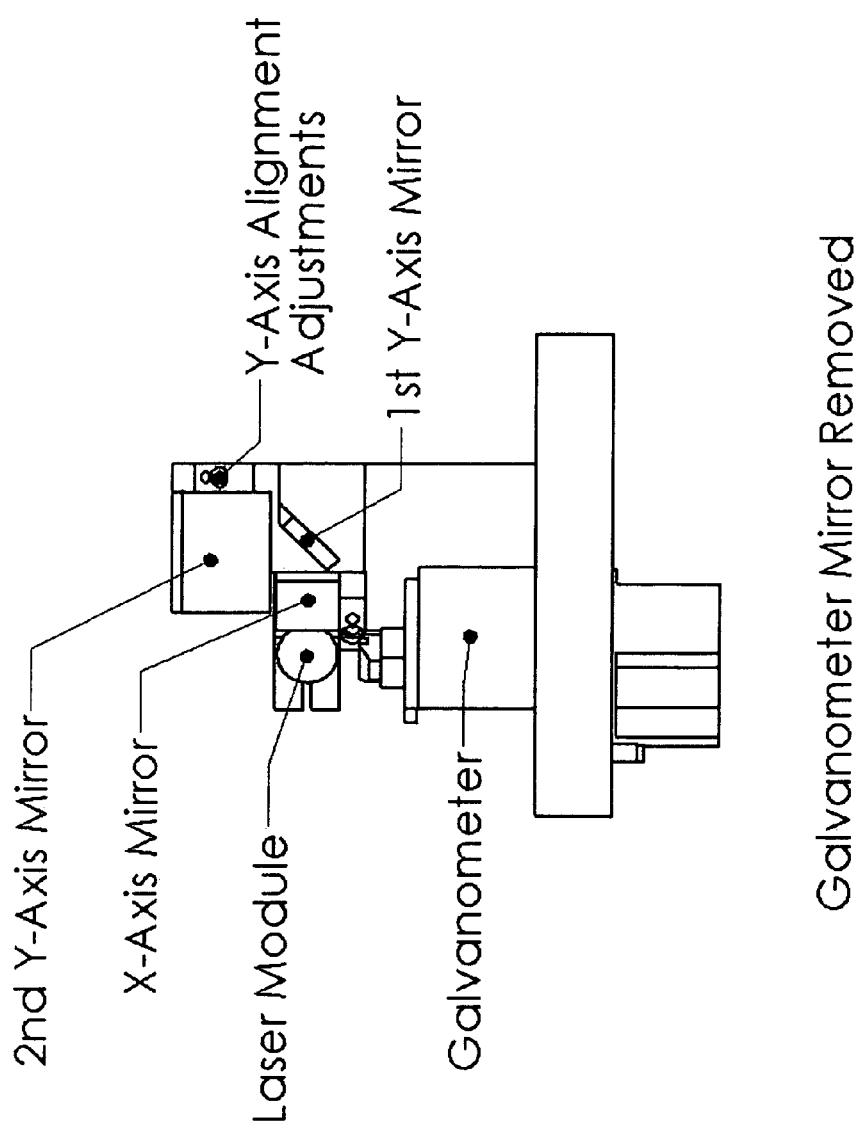
Figure 40:
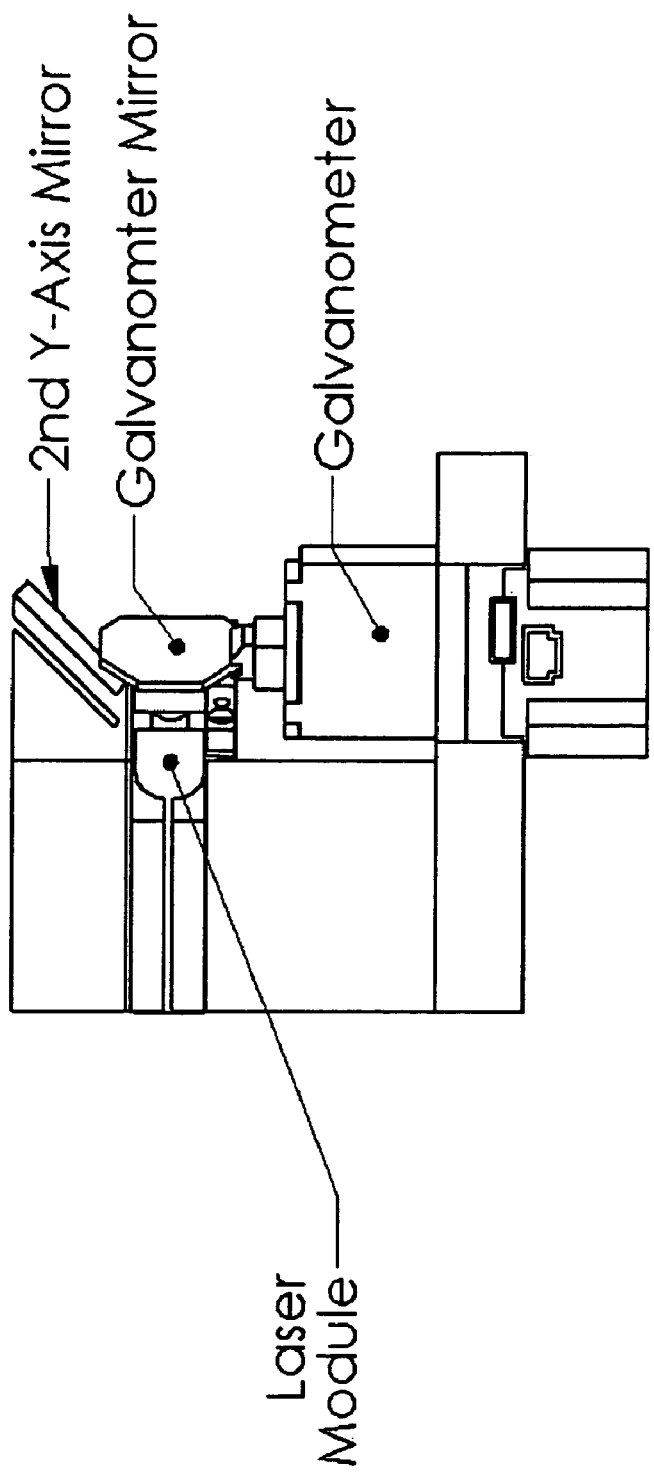

A two-axis design may be utilized. Multiple optical paths, multiple scan configurations for a given optical path may be used. UV lasers or red lasers may be used. Single or dual galvanometer designs may be used. An internal line generator or an external line generator may be used. In fact, an "internal-external line generator" may be used, because without an internal line generator, the laser beam may be wide enough to appear on both the X and Y turning mirrors simultaneously, and thus appeared in the X and Y scan fields simultaneously. An internal line generator is thus useful, but the device may also have external line generating optics. Indeed, in some embodiments, a single galvo or dual galvo, either having internal LG optics, external LG optics or internal and external LG optics, may be utilized. A single galvo with internal line generator may be used, having three simple mirrors. Two sizes may be used: ½"×½" and 1"×1". Small line generation optics are used, with a simple optics mounting. FIGS. 26 to 31 schematically represent various galvo designs, while FIGS. 32 to 33b schematically represent beam emission in elapsed time. It should be noted that the axis representations in these figures may not correspond exactly to those in the prior figures. In an exemplary embodiment, the radiation emitter includes a single line optical beam emitter, a prism, and a rotatable mirror assembly, wherein the radiation emitter is adapted to rotate the rotatable mirror assembly so that a single line optical beam emitted by the single line optical beam emitter is deflected by the mirror to project the emitted single line optical beam in a first orientation. The radiation emitter is further adapted to rotate the rotatable mirror assembly so that the single line optical beam emitted by the single line optical beam emitter passes through the prism to project the emitted single line optical beam in a second orientation different from the first orientation. In this manner, a single optical beam projector (e.g., laser) may be used instead of two projectors (laser generators). Of course, other embodiments of the present invention may utilize multiple generators that are synchronized to obtain lines at various orientations.

Regarding line quality and characteristics, to obtain a beam width of 0.25" at 75 feet, using a UV laser diode with an emitting region of approximately one micron in width, a diffraction-limited cylindrical lens of at least 3 mm diameter is used, located at least 3 mm from the emitting region. Accordingly, a line width of 2 mm at a range of 8 feet, using a 635 nm laser, and a line width of 10 mm at 75 feet, with the same laser module may be obtained.

Since scanning may be done by a single axis scanner, rather than a tip-tilting plate, scans in the X and Y directions may have different virtual centers. The apparent sources of the X and Y scans are separated by approximately 9 mm in the X-direction, 13 mm in the Y-direction, and 13.5 mm in the Z direction (again, these axis may not correspond to those in the figures previously referred to herein). This has two effects on the scan registration at the sensor, both of which are minor at more than several feet working distance. The first effect is due to the apparent lateral separation of the sources. This parallax error results in the misregistration of the X- and Y-scans with changing ranges. The effect is about the same as what one would see if one held a flashlight in each extended hand, and aimed them at a single object. Objects both closer and farther away would register in different parts of the two beams. The effect is very small, though, since the virtual separation of the sources in the actual device is only about 16 mm. When the object is 8 feet away, the beam centers diverge at arctan ($16/2400$), or 0.38 degrees. This would result in a mis-registration of 1 mm for every 6 inches change in range. At a range of 75 feet, it would result in a mis-registration of 1 mm for every 56 inches change in range. Moreover, computers may be used to compensate for this. The only practical effect of this mis-registration is to reduce the coincident area over which both beams scan, as the range changes. Because the beams grow with range, the parallax error shrinks as a percentage of the area scanned. When the beams are aligned at 75 feet, this parallax error will cause the beams to overlap by only 90% when the range shrinks to 10 feet or so, 100% at 75 feet, and about 95% at one mile. For testing the system will be aligned at a range of 8 feet.

The second effect is due to the apparent longitudinal separation of the X and Y beam sources. This effect causes the Y beam to scan an area which is 1.3 mm larger than the X beam at any given range. This effect is negligible at all ranges where the beams are coincident.

The mirrors in the scanner are oriented to minimize errors of the scan. These errors take the form of coincidence errors, perpendicularity errors and keystone errors. Keystone errors cause the scan to travel farther along one edge than the other (the beam is actually sweeping out part of a large circle in the image plane), resulting in a keystone shaped scanned area. Perpendicularity errors cause the X and Y scans to travel at an angle other than 90 degrees to each other. Coincidence errors cause the centers of the X and Y scans to be non-coincident in the image plane. The result of these errors is to reduce the area of coincidence over which the X and Y scans travel and, in the case of perpendicularity errors, add crosstalk between the two axis. The mirrors are arranged so that all of these errors are normally either zero throughout the scan or at a minimum (zero) at the center of the scan.

Manufacturing errors in the mirror supports can move the orientations of the mirrors away from their designed positions, and thus cause the above-mentioned errors to become non-zero. Typical manufacturing errors are on the order of 0.003". Assuming that each of the mirrors has a tilt error of this magnitude across its surface, the resulting scanned area at a range of 75 feet would be significantly reduced.

Manufacturing errors can be corrected by building into the device an X tilt adjustment on the X scan mirror and a Y tilt adjustment on the Y scan mirror. When those two adjustments are used to correct the manufacturing errors, the resulting scan can be restored to nearly its original condition. Even if some error, such as perpendicularity error, remains, as long as it is small, it may be effectively ignored.

The following material might be used to implement this embodiment: A fabricated XY scan mirror support block, a fabricated X scan mirror support block a fabricated Base, a fabricated Y scan mirror support block, a fabricated Laser support block, a fabricated Scanner support block a fabricated Laser aperture, a Thorlabs 2nd Y-scan mirror—ME1S-G01, a Thorlabs 1st Y-scan mirror—ME1S-G01, a Thorlabs X scan mirror—ME05S-G01, a Nutfield Technology, Inc. Scanner Mirror—10 mm X mirror, assembly, a Nutfield Technology, Inc. Scanner—Part No. HS-15C, a World Star Tech Laser Module—Part No. UTL5-10G-635.

FIGS. 34-39 present an example of a design for a scanner head, which is approximately 4×4×4 inches in dimension.

In some embodiments, the scan area is 2'×2' at 12' distance. Operation is at 25 Hz. FIGS. 34-39 schematically represent an emitter according to an embodiment of the present invention.

Again, the above may be scaled for actual implementation.

It is noted that while the above has been described in terms of application for determining a position of a refueling drogue relative to a reference point, and thus controlling the position of the refueling drogue relative to a refueling point, other embodiments of the present invention might be utilized to determine the location of other types of targets and/or control the location of those targets. Such targets may include, for example, aircraft, landcraft, boats, autonomous drones, satellites, etc. Indeed, some embodiments of the present invention may be implemented by placing a radiation emitter up on a tower, and scanning an area below the tower, such as a runway, a parking lot, a construction site, etc, and using the invention to control/position autonomous drones, autonomous vehicles (alleviating the need for a parking attendant), construction equipment such as bulldozers, etc.

Given the disclosure of the present invention, one versed in the art would appreciate that there may be other embodiments and modifications within the scope and spirit of the present invention. Accordingly, all modifications attainable by one versed in the art from the present disclosure within the scope and spirit of the present invention are to be included as further embodiments of the present invention. The scope of the present invention accordingly is to be defined as set forth in the appended claims.

What is claimed is:

1. An aerial refueling system comprising:
   a refueling drogue assembly including a refueling drogue and a refueling hose in captive relation with the refueling drogue; and
   a drogue positioning system, the drogue positioning system including a radiation emitter, a radiation receiver and a signal processor;
   wherein the radiation emitter is adapted to direct radiation to a positioning area a defined distance from the radiation emitter, the positioning area including a plurality of positions where at least one of the radiation emitter and the radiation receiver are expected to be located, the radiation carrying a modulated location signal containing information corresponding to at least a portion of the plurality of positions within the positioning area using a predetermined coordinate system;
   wherein the radiation receiver is adapted to receive at least a portion of the emitted radiation carrying the modulated signal and output a signal to the signal processor indicative of the modulation of the location signal of the received radiation; and
   wherein the signal processor is adapted to process the outputted signal and identify the at least a portion of the plurality of positions within the positioning area indicative of the location in the positioning area of the received radiation,
   wherein the radiation emitted by the radiation emitter is a focused beam and the radiation emitter is adapted to scan the focused beam over the positioning area;
   wherein the drogue positioning system is adapted to virtually divide at least a portion of the positioning area into a virtual grid, the virtual grid including a plurality of distributed distinct sectors, the distributed distinct sectors spatially corresponding to sub-areas within the positioning area, the sub-areas being disbursed within the positioning area in a geometrically defined manner;
   wherein the drogue positioning system is adapted to change the modulated location signal carried on the focused beam as the focused beam is scanned over the positioning area, wherein change in the modulated location signal corresponds in a defined manner to the sub-areas such that a modulated location signal indicative of a beam being directed at a first sub-area is distinct from a modulated location signal indicative of a beam being directed at a second sub-area; and
   wherein the signal processor is adapted to analyze one or more outputted signals from the receiver indicative of the modulation of the location signal and identify a distinct sector corresponding to the received modulated location signal carried on the focused beam.

2. The system of claim 1, wherein the radiation emitter is adapted to emit a focused optical beam and scan the focused optical beam over the positioning area.

3. The system of claim 2, wherein the radiation emitter is adapted to emit a focused optical beam and scan the focused optical beam over the positioning area in an X-Y raster.

4. The system of claim 1, wherein the emitted radiation is a focused optical beam, wherein the modulated location signal includes a plurality of digital data blocks, the plurality of digital data blocks containing information respectively corresponding to a plurality of discrete positions within the positioning area that respectively correspond to a current location of the focused beam within the positioning area.

5. The system of claim 4, wherein the radiation emitter is adapted to emit the focused optical beam and scan the focused optical beam over the positioning area.

6. The system of claim 4, wherein the radiation receiver is adapted to receive at least a portion of the focused beam when at least that portion of the focused beam is directed at the radiation receiver, and wherein the signal outputted by the receiver is indicative of the information contained in at least one digital data block carried by the received radiation.

7. The system of claim 4, wherein the radiation receiver is adapted to receive at least a portion of the focused beam when at least that portion of focused beam is directed at the radiation receiver and determine whether a full digital data block carried by the focused beam has been received, and only if a full digital data block has been received, output the signal to the signal processor, wherein the outputted signal is indicative of the information contained in the full digital data block received.

8. The system of claim 1, wherein the signal processor identifies a sub-area at which the beam is directed based on the identification of the distinct sector corresponding to the received modulated location signal carried on the emitted radiation.

9. The system of claim 8, wherein the radiation receiver is mounted on the refueling drogue assembly, wherein the aerial refueling system includes an active control system adapted to regulate the position of the radiation receiver within the positioning area when the refueling drogue is extended from a refueling aircraft.

10. The system of claim 9, wherein the active control system is adapted to regulate the vertical and horizontal position of the drogue to maintain a substantially fixed orientation of the receiver within the positioning area.

11. The system of claim 1, wherein the signal processor is adapted to analyze a first outputted signal and a second outputted signal outputted after the first outputted signal to determine a location in the virtual grid at which the distinct sectors coincide; the first and second outputted signals being respectively indicative of the modulation of the location signal of the beam received by the receiver.

12. The system of claim 11, wherein the signal processor identifies a sub-area at which the beam is directed based on the determination of the location in the virtual grid at which the distinct sectors coincide.

13. The system of claim 11, wherein the radiation emitted by the radiation emitter is a focused optical elongated beam and the radiation emitter is adapted to scan the focused optical elongated beam over the positioning area in a dual-pass manner, wherein the first outputted signal is generated by the reception of at least a portion of the focused optical elongated beam in a first pass of the beam over the positioning area, and wherein the second outputted signal is generated by the reception of at least a portion of the focused optical elongated beam in a second pass of the beam over the positioning area.

14. The system of claim 13, wherein the focused optical elongated beam of the first pass is normal to the focused optical elongated beam of the second pass.

15. The system of claim 13, wherein the drogue positioning system is adapted to identify the location of the receiver within the positioning area based on the coincidence of the first optical elongated beam and the second optical elongated beam.

16. The system of claim 1, wherein the aerial refueling system includes an active control system adapted to regulate the position of the refueling drogue assembly with respect to a refueling aircraft when the refueling drogue is extended from the refueling aircraft.

17. The system of claim 16, wherein the active control system is adapted to regulate a position of the radiation receiver so that the position of the radiation receiver is substantially constant within the positioning area.

18. The system of claim 1, wherein the radiation emitter includes:
a single line optical beam emitter;
a prism; and
a rotatable mirror assembly;
wherein the radiation emitter is adapted to rotate the rotatable mirror assembly so that a single line optical beam emitted by the single line optical beam emitter is deflected by the mirror to project the emitted single line optical beam in a first orientation; and wherein the radiation emitter is adapted to rotate the rotatable mirror assembly so that the single line optical beam emitted by the single line optical beam emitter passes through the prism to project the emitted single line optical beam in a second orientation different from the first orientation.

19. An aerial refueling system comprising:
a refueling drogue assembly including a refueling drogue and a refueling hose in captive relation with the refueling drogue; and
a drogue positioning system, the drogue positioning system including a radiation emitter, a radiation receiver, and a signal processor;
wherein the radiation emitter is adapted to direct a beam of emitted radiation to an area away from the radiation emitter, the radiation including discernable properties that vary in a corresponding manner with varying orientation of the beam of radiation with respect to the radiation emitter;
wherein the radiation receiver is adapted to receive at least a portion of the emitted radiation and output a signal to the signal processor indicative of one or more of the discernable properties of the received radiation;
wherein the processor is adapted to process the outputted signal and identify a first virtual orientation indicative of an orientation of the receiver relative to the radiation emitter when at least a portion of the radiation was received by the receiver,
wherein the radiation emitted by the radiation emitter is a focused beam and the radiation emitter is adapted to scan the focused beam over the area;
wherein the drogue positioning system is adapted to virtually divide at least a portion of the various possible orientations of the beam relative to the radiation emitter into a beam zone, the beam zone including a plurality of distributed distinct vectors, the distributed vectors spatially corresponding to actual orientations of the beam with respect to the radiation emitter, the actual orientations being disbursed within the beam zone in a geometrically defined manner;
wherein the radiation emitter is adapted to change a modulated signal carried on the focused beam as the focused beam is scanned over the area to obtain different modulated signals, the different modulated signals corresponding in a defined manner to the actual orientations such that a modulated signal indicative of a beam being directed along a first orientation is distinct from a modulated signal indicative of a beam being directed along a second orientation; and
wherein the signal processor is adapted to analyze the outputted signal from the receiver indicative of the modulation of the signal and identify the distinct vector corresponding to the received modulated signal carried on the emitted radiation.

20. The system of claim 19, wherein the radiation emitter is adapted to emit a focused optical beam modulated with digital data blocks, the modulated digital data blocks respectively indicative of discrete orientations respectively corresponding to orientations of the beam relative to the radiation emitter.

21. The system of claim 20, wherein at least some of the varied discernable properties are respectively indicative of discrete orientations respectively corresponding to orientations of the beam relative to the radiation emitter in a first reference frame, and wherein at least some of the varied discernable properties are respectively indicative of discrete orientations respectively corresponding to orientations of the beam relative to the radiation emitter in a second reference frame.

22. The system of claim 20, wherein the radiation receiver is adapted to receive the focused beam carrying the digital data blocks when the focused beam is directed at the radiation receiver and output the signal to the signal processor, wherein the outputted signal is indicative of the information contained in a digital data block carried on the received beam, and wherein the processor is adapted to analyze the outputted signal from the receiver indicative of the information contained in the received digital data block and identify the orientation of the beam relative to the radiation emitter based on the information contained in the received digital data block to identify the first virtual orientation.

23. The system of claim 19, wherein the signal processor is adapted to identify the orientation of the receiver relative to the radiation emitter based on the identified distinct vector.

24. The system of claim 19, wherein the signal processor determines at least one of (i) the distinct vector along which the beam is directed based on the identification of the distinct vector corresponding to the received modulated signal carried on the emitted radiation and (ii) the orientation along which the beam is directed based on the identification of the distinct vector corresponding to the received modulated signal carried on the emitted radiation.

25. The system of claim 19, wherein the aerial refueling system includes an active control system adapted to regulate the position of the refueling drogue with respect to a refueling aircraft when the refueling drogue is extended from the refueling aircraft.

26. The system of claim 25, wherein the radiation receiver is mounted on the refueling drogue assembly, wherein the active control system is adapted to regulate the position of the radiation receiver when the refueling drogue is extended from a refueling aircraft.

27. The system of claim 25, wherein the active control system is adapted to regulate the vertical and horizontal position of the drogue to maintain a substantially fixed orientation of the receiver with respect to the radiation emitter.

* * * * *